（12） United States Patent
Hayashi et al.

(10) Patent No.: US 8,434,866 B2
(45) Date of Patent: May 7, 2013

(54) POLYMERIZABLE COMPOSITION FOR OPTICAL MATERIAL, OPTICAL MATERIAL, AND METHOD FOR PREPARING THE OPTICAL MATERIAL

(75) Inventors: Hidetoshi Hayashi, Omuta (JP); Masaru Kawaguchi, Omuta (JP); Akinori Ryu, Arao (JP); Hironori Kuboi, Ogori (JP); Mamoru Takashina, Omuta (JP); Seiichi Kobayashi, Omuta (JP); Touru Miura, Noshitokyo (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 675 days.

(21) Appl. No.: 12/535,745

(22) Filed: Aug. 5, 2009

(65) Prior Publication Data

US 2010/0075154 A1 Mar. 25, 2010

Related U.S. Application Data

(60) Provisional application No. 61/099,264, filed on Sep. 23, 2008, provisional application No. 61/119,468, filed on Dec. 3, 2008, provisional application No. 61/193,579, filed on Dec. 8, 2008.

(30) Foreign Application Priority Data

Sep. 22, 2008 (JP) ................................ 2008-242388
Dec. 3, 2008 (JP) ................................ 2008-308318
Dec. 8, 2008 (JP) ................................ 2008-311974

(51) Int. Cl.
*G02C 7/10* (2006.01)
*B32B 27/40* (2006.01)
*C08L 75/04* (2006.01)

(52) U.S. Cl.
USPC .................... 351/159.57; 428/423.1; 525/452

(58) Field of Classification Search .................. 525/452; 351/159.57; 428/423.1
See application file for complete search history.

(56) References Cited

U.S. PATENT DOCUMENTS

| 5,087,758 | A | 2/1992 | Kanemura et al. |
| 5,191,055 | A | 3/1993 | Kanemura et al. |
| 5,576,412 | A | 11/1996 | Hirata et al. |
| 5,594,088 | A | 1/1997 | Nagata et al. |
| 5,693,738 | A * | 12/1997 | Okazaki et al. ................ 528/51 |
| 5,753,730 | A * | 5/1998 | Nagata et al. ................ 524/136 |
| 6,441,119 | B1 | 8/2002 | Kosaka et al. |
| 6,448,304 | B1 | 9/2002 | Kosaka et al. |
| 8,084,133 | B2 * | 12/2011 | Colton ........................... 428/447 |
| 2002/0132954 | A1 | 9/2002 | Kosaka |
| 2003/0064303 | A1 | 4/2003 | Nishimura et al. |
| 2003/0125410 | A1 | 7/2003 | Keita et al. |
| 2004/0026658 | A1 | 2/2004 | Yoshimura et al. |
| 2004/0141230 | A1 | 7/2004 | Kosaka |
| 2007/0058253 | A1 * | 3/2007 | Aiiso et al. ..................... 359/487 |
| 2009/0136746 | A1 * | 5/2009 | Murai et al. ................... 428/339 |
| 2009/0143498 | A1 * | 6/2009 | Toki et al. ...................... 523/106 |
| 2010/0292430 | A1 | 11/2010 | Ryu et al. |
| 2011/0190466 | A1 | 8/2011 | Hayashi et al. |

FOREIGN PATENT DOCUMENTS

| CN | 1405198 A | 3/2003 |
| JP | 62-267316 A | 11/1987 |
| JP | 64-045611 A | 2/1989 |
| JP | 1-311118 A | 12/1989 |
| JP | 2-270859 A | 11/1990 |
| JP | 5-273401 A | 10/1993 |
| JP | 11-322930 A | 11/1999 |
| JP | 2001-091906 A | 4/2001 |
| JP | 2001-091907 A | 4/2001 |
| JP | 2001-091908 A | 4/2001 |
| JP | 2002-082203 A | 3/2002 |
| JP | 2002-234997 A | 8/2002 |
| JP | 2003-026753 A | 1/2003 |
| JP | 2006-001982 A | 1/2006 |
| JP | 2006-003624 A | 1/2006 |
| JP | 2008-015465 A | 1/2008 |
| JP | 2008-255221 A | 10/2008 |
| KR | 10-2002-0092921 | 12/2002 |
| KR | 10-2004-0063136 A | 7/2004 |
| WO | WO 2007/097116 | 8/2007 |

OTHER PUBLICATIONS

Office Action from Korean patent Office issued in corresponding Korean Patent Application No. 10-2009-7026880 dated Aug. 2, 2010.
Ryu et al., U.S. Appl. No. 12/863,790, entitled "*Polymerizable Composition for Optical Material, Optical Material and Method for Producing Optical Material*", filed Jul. 21, 2010.
International search Report of Application No. PCT/JP2009/00454 dated Apr. 28, 2009.
Korean Office Action dated Apr. 22, 2010.
International Search Report (Form PCT/ISA/210) issued in corresponding PCT Application No. PCT/JP2009/003707 dated Oct. 27, 2009.
Office Action issued in corresponding Korean Patent Application No. *** dated Sep. 21, 2012.

* cited by examiner

*Primary Examiner* — Thao T. Tran
(74) *Attorney, Agent, or Firm* — Buchanan Ingersoll & Rooney PC

(57) ABSTRACT

The polymerizable composition for an optical material of the present invention comprises a phenylene diisocyanate, at least one polythiol compound selected from the group consisting of 4-mercaptomethyl-1,8-dimercapto-3,6-dithiaoctane, 4,8-, 4,7- or 5,7-dimercaptomethyl-1,11-dimercapto-3,6,9-trithiaundecane, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane 3-mercaptomethyl-1,5-dimercapto-2,4-dithiapentane and tris(mercaptomethylthio)methane.

13 Claims, No Drawings

POLYMERIZABLE COMPOSITION FOR OPTICAL MATERIAL, OPTICAL MATERIAL, AND METHOD FOR PREPARING THE OPTICAL MATERIAL

This application claims priority under 35 U.S.C. §119 from U.S. Provisional Application Ser. No. 61/099,264, filed Sep. 23, 2008, No. 61/119,468, filed Dec. 3, 2008 and No. 61/193,579, filed Dec. 8, 2008. This application is based on Japanese patent applications No. 2008-242388, No. 2008-308318 and No. 2008-311974, the contents of which are incorporated hereinto by reference.

BACKGROUND

1. Technical Field

The present invention relates to a polymerizable composition for an optical material, an optical material obtained from the polymerizable composition for an optical material, and a method for preparing the optical material.

2. Related Art

Conventionally, a plastic lens has been used as a replacement for an inorganic material in the applications of optical components. These plastic lenses are lightweight and non-brittle as compared to the inorganic materials that had been preferably used until then, and can be colored, and therefore, they have been used appropriately. Particularly, in the case of using as the optical components such as a lens, there is a demand for a plastic material having a high refractive index. As the plastic material having a high refractive index, for example, there have been suggested a sulfur-containing urethane resin (thiourethane resin) in Patent Documents 1 to 3, and an episulfide resin in Patent Document 4.

Furthermore, recently, a thinner spectacle lens has come into demand from the viewpoint of fashionability, and further, "a 2-point frame", which a frame for supporting the spectacle lens is not provided in the fringe of the spectacle lens and the spectacle lens is supported with two holes on both ends thereof, has been used. In order to lessen the thickness of the spectacle lens, a higher refractive index of the optical material was required. Meanwhile, when the 2-point frame is used, a process for ma king two holes on both ends of the spectacle lens ("2-point process") is carried out, and thus the spectacle lens has been required to have excellent processibility and high strength. In addition, there was a demand for a material having excellent light resistance so as to withstand outdoor use.

[Patent Document 1] Japanese Laid-open Patent Publication No. H2-270859
[Patent Document 2] Specification of Chinese Laid-open Patent Publication No. 1405198
[Patent Document 3] Japanese Laid-open Patent Publication No. H5-273401
[Patent Document 4] Japanese Laid-open Patent Publication No. H11-322930

SUMMARY

However, the optical materials as described in Patent Documents 1 to 4 had room for improvement in the high refractive index, the mechanical strength, and the light resistance. In particular, in the case where they were used as the plastic lens using a 2-point frame, there was a tendency for the strength to be insufficient. The 2-point frame is fixed at only two points on both ends of the spectacle lens, and thus, the stress becomes easily focused on these points. Accordingly, the spectacle lens had cracks or breaks at the two points on both ends during use in some cases.

Taking these circumstances into consideration, the present invention has been made, and thus it is an object thereof to provide a polymerizable composition for an optical material which is capable of providing an optical material having a high refractive index, excellent light resistance and improved mechanical strength.

The present inventors have found that the above-described problems are solved by a polymerizable composition containing a phenylene diisocyanate and a specific polythiol compound, thereby completing the present invention.

Specifically, the present invention relates to the following.

(1) A polymerizable composition for an optical material, containing:
a phenylene diisocyanate, and
at least one polythiol compound selected from the group consisting of 4-mercaptomethyl-1,8-dimercapto-3,6-dithiaoctane, 4,8-, 4,7- or 5,7-dimercaptomethyl-1,11-dimercapto-3,6,9-trithiaundecane, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane and tris(mercaptomethylthio)methane.

(2) The polymerizable composition for an optical material as described in (1), wherein the molar ratio represented by SH groups/NCO groups is 1.0 to 2.0.

(3) The polymerizable composition for an optical material as described in (1) or (2), wherein the phenylene diisocyanate includes m-phenylene diisocyanate.

(4) The polymerizable composition for an optical material as described in any one of (1) to (3), wherein the phenylene diisocyanate is m-phenylene diisocyanate.

(5) The polymerizable composition for an optical material as described in any one of (1) to (4), further comprising an aliphatic polyisocyanate compound having 4 to 8 carbon atoms.

(6) The polymerizable composition for an optical material as described in (5), wherein the aliphatic polyisocyanate compound having 4 to 8 carbon atoms is at least one selected from the group consisting of hexamethylene diisocyanate and pentamethylene diisocyanate.

(7) The polymerizable composition for an optical material as described in any one of (1) to (6), further comprising a compound represented by the general formula (1) and/or a compound represented by the general formula (2):

$$M(L)n \quad (1)$$

wherein M represents Al, Fe, Cu, Zn, Zr or Bi, L represents a dithiocarbamic acid group, a sulfonic acid group, a mono- or dialkylphosphoric ester group, a substituted acetylacetonato group or halogen, and n represents an integer of 1 to 5,

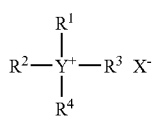

wherein R1, R2, R3 and R4 each independently represent hydrogen, a monovalent or greater linear aliphatic, cyclic aliphatic or aromatic organic residue, R1, R2, R3 and R4 may be bonded to each other to form a ring, X represents an organic acid group or an inorganic acid group and Y represents a nitrogen or phosphorus atom.

(8) The polymerizable composition for an optical material as described in any one of (1) to (7), further comprising a phosphoric monoester represented by the general formula (3) and/or a phosphoric diester represented by the general formula (4):

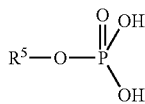
(3)

wherein R5 represents an aliphatic or aromatic organic residue having 2 to 12 carbon atoms,

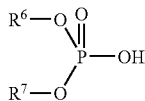
(4)

wherein $R^6$ and $R^7$ each represent an aliphatic or aromatic organic residue having 2 to 12 carbon atoms, $R^6$ and $R^7$ may be bonded to each other to form a ring, and may be the same as or different from each other.

(9) An optical material obtained by curing the polymerizable composition for an optical material as described in any one of (1) to (8).

(10) A plastic lens obtained by curing the polymerizable composition for an optical material as described in any one of (1) to (8).

(11) A method for preparing an optical material, including curing the polymerizable composition for an optical material as described in any one of (1) to (8).

(12) The method for preparing an optical material as described in (11), which includes molding the polymerizable composition for an optical material by cast polymerization.

(13) The plastic lens as described in (10), which has a hard coat layer containing metal oxide fine particles provided on at least one side.

(14) The plastic lens as described in (13), wherein the hard coat layer contains 20 to 80% by mass of metal oxide fine particles.

(15) The plastic lens as described in (14), wherein the metal oxide fine particles are titanium oxide fine particles.

According to the present invention, a polymerizable composition for an optical material which is capable of providing an optical material having a high refractive index, excellent light resistance and improved mechanical strength, that is, an optical material having an excellent balance of these physical properties can be provided, and an optical material obtained from the polymerizable composition, can be provided.

DETAILED DESCRIPTION

Hereinbelow, the polymerizable composition for an optical material of the present invention will be described.

The polymerizable composition for an optical material of the present invention contains:
a phenylene diisocyanate, and
at least one polythiol compound selected from the group consisting of 4-mercaptomethyl-1,8-dimercapto-3,6-dithiaoctane, 4,8-, 4,7- or 5,7-dimercaptomethyl-1,11-dimercapto-3,6,9-trithiaundecane, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane and tris(mercaptomethylthio)methane.

By combining the specific isocyanate compound and the polythiol compound, an optical material having a high refractive index, excellent light resistance and a further improved mechanical strength can be obtained. An optical material comprised of the polymerizable composition for an optical material of the present invention is particularly excellent in tensile strength among the other strengths, and thus, it exhibits excellent durability in the case where it is used as a plastic spectacle lens for a 2-point frame.

The polymerizable composition for an optical material of the present invention has a molar ratio represented by SH groups/NCO groups of 1.0 to 2.0, preferably 1.0 to 1.5, more preferably 1.05 to 1.4, and particularly preferably 1.2 to 1.4.

In the above-described ranges, an optical material having a high refractive index, a high heat resistance and an excellent light resistance, as well as a further improved strength can be obtained. Particularly, a plastic lens for a 2-point frame having excellent light resistance as well as a further improved tensile strength can be obtained. Further, in the above-described range having a lower limit of 1.05 or more, an optical material having a higher refractive index as well as a more desirable color can be obtained. In addition, by setting the molar ratio in the range of 1.4 or less, an optical material having a more improved heat resistance can be obtained.

The "the molar ratio represented by SH groups/NCO groups" in the present invention refers to the ratio of the total mole number of the isocyanato groups contained in the phenylene diisocyanate constituting the polymerizable composition for the optical material of the present invention to the total mole number of the mercapto groups contained in a predetermined polythiol compound constituting the polymerizable composition for the optical material of the present invention.

Further, in the case where the "other isocyanate compound" and the "isothiocyanate compound" in addition to the phenylene diisocyanate is contained, the mole number of the isocyanato groups contained in the "other isocyanate compound" and/or the isothiocyanato groups contained in the "isothiocyanate compound" is added to the calculation. Further, in the case where the "other (poly)thiol compound" in addition to a predetermined polythiol compound is contained, it refers to the total mole number of the total mercapto groups contained in the polymerizable composition for the optical material.

In the case where the polythiol compound is a mixture, it can be determined by a milli-equivalent number (meq/g, hereinafter referred to as an SHV value) of the mercapto groups in 1 g of the thiol compound as determined by a known titration.

The phenylene diisocyanate used in the present invention is at least one or a mixture of two or more of an o-phenylene diisocyanate in which one isocyanate group is bonded at an ortho position of the benzene ring, a m-phenylene diisocyanate in which one isocyanate group is bonded at a meta position of the benzene ring, and a p-phenylene diisocyanate in which one isocyanate group is bonded at a para position of the benzene ring, respectively, with respect to the other isocyanate. Preferably, it contains the m-phenylene diisocyanate group, and more preferably, it contains the m-phenylene diisocyanate alone. In the case where other components in addition to the m-phenylene diisocyanate are contained, the content of the other components, that is, the o-phenylene diisocyanate and/or the p-phenylene diisocyanate, is 50% or less, and more preferably 10% or less.

By using the phenylene diisocyanate as above mentioned, a polymerizable composition for an optical material having excellent moldability, which is capable of providing an optical material having high refractive index and excellent transparency, can be obtained.

<Other Isocyanate Compounds>

In addition to the phenylene diisocyanate, other isocyanate compounds as described below can also be used.

Examples of other isocyanate compounds include:

aliphatic polyisocyanate compounds such as pentamethylene diisocyanate, hexamethylene diisocyanate, 2,2,4-trimethyl hexamethylene diisocyanate, 2,4,4-trimethyl hexamethylene diisocyanate, lysine diisocyanatomethyl ester, lysine triisocyanate, o-xylylene diisocyanate, m-xylylene diisocyanate, p-xylylene diisocyanate, α,α,α',α'-tetramethyl xylylene diisocyanate, bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane;

alicyclic polyisocyanate compounds such as isophorone diisocyanate, bis(isocyanatomethyl)cyclohexane, dicyclohexyl methane diisocyanate, cyclohexane diisocyanate, methylcyclohexane diisocyanate, dicyclohexyldimethylmethane isocyanate, 2,5-bis(isocyanatomethyl)bicyclo[2.2.1]-heptane, 2,6-bis(isocyanatomethyl)bicyclo[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane;

aromatic polyisocyanate compounds such as tolylene diisocyanate, 4,4'-diphenyl methane diisocyanate, diphenylsulfide-4,4-diisocyanate, ethylphenylene diisocyanate, isopropylphenylene diisocyanate, dimethylphenylene diisocyanate, diethylphenylene diisocyanate, diisopropylphenylene diisocyanate, trimethylbenzenetriisocyanate, benzenetriisocyanate, biphenyl diisocyanate, toluidine diisocyanate, 3,3-dimethyl diphenyl methane-4,4-diisocyanate, bibenzyl-4,4-diisocyanate, bis(isocyanatophenyl)ethylene, 3,3-dimethoxybiphenyl-4,4-diisocyanate, phenylisocyanatoethylisocyanate, triphenylmethanetriisocyanate, naphthalene diisocyanate; and heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane.

Moreover, the compounds that some isocyanate groups of the isocyanate compounds as exemplified above are replaced with the isothiocyanato groups can be included.

Examples of the isothiocyanate compounds include:

aliphatic polyisothiocyanate compounds such as pentamethylene diisothiocyanate, hexamethylene diisothiocyanate, lysine diisothiocyanatemethyl ester, lysine triisothiocyanate, m-xylylene diisothiocyanate, bis(isothiocyanatomethyl)sulfide, bis(isothiocyanatoethyl)sulfide, bis(isothiocyanatoethyl)disulfide;

alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, 2,5-bis(isothiocyanatomethyl)bicyclo[2.2.1]-heptane, 2,6-bis(isothiocyanatomethyl)bicyclo[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane;

aromatic polyisothiocyanate compounds such as tolylene diisothiocyanate, 4,4-diphenylmethane diisothiocyanate, diphenyldisulfide-4,4-diisothiocyanate; and sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane.

In addition, halogen-substituted products of the isocyanate compounds such as a chlorine-substituted product thereof, a bromine-substituted product thereof, alkyl-substituted products thereof, alkoxy-substituted products thereof, nitro-substituted products thereof, prepolymer-type modified products thereof with polyalcohols, carbodiimide modified products thereof, urea modified products thereof, biuret modified products thereof, dimerization reaction products thereof can also be used as other isocyanate compounds. These isocyanate compounds can be used as single or in combination of two or more kinds thereof.

It is preferable from the viewpoints of a high refractive index, mechanical properties, ready availability, and the like, that m-xylylene diisocyanate, tolylene diisocyanate, 4,4'-diphenyl methane diisocyanate, or naphthalene diisocyanate is used as single or in combination of two or more kinds thereof among other isocyanate compounds as described above.

Furthermore, it is preferable to mix and use an aliphatic polyisocyanate from the viewpoint of the color and the impact resistance of the resin. The aliphatic polyisocyanate is preferably a linear aliphatic polyisocyanate having 4 to 8 carbon atoms, and more preferably a linear aliphatic polyisocyanate having 5 to 7 carbon atoms. It is even more preferably 1,6-hexamethylene diisocyanate or 1,5-pentamethylene diisocyanate from the viewpoint of ready availability, ease of handling in terms of the vapor pressure or the viscosity, and improved impact resistance of the resin, or others.

Further, in the present invention, at least one polythiol compound selected from the group consisting of 4-mercaptomethyl-1,8-dimercapto-3,6-dithiaoctane, 4,8-, 4,7- or 5,7-dimercaptomethyl-1,1'-dimercapto-3,6,9-trithiaundecane, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane and tris(mercaptomethylthio)methane as described above, is simply referred to as the "polythiol compound", and other (poly)thiol compounds other than the polythiol compound are referred to as "other (poly)thiol compound".

<Other (poly)thiol Compound>

In addition to the polythiol compound used in the present invention, other thiol compounds or other polythiol com pounds as described below can also be used. Examples of other thiol compounds include:

2-mercaptoethanol, 3-mercapto-1,2-propanediol, glycerine bis(mercaptoacetate), 4-mercaptophenol, 2,3-dimercapto-1-propanol, pentaerythritol tris(3-mercaptopropionate), pentaerythritol tris(thioglycolate).

Further, other polythiol compounds as described below can also be used, and examples thereof include:

aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethyleneglycol bis(2-mercaptoacetate), diethyleneglycol bis(3-mercaptopropionate), ethyleneglycol bis(2-mercaptoacetate), ethyleneglycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis mercaptoacetate, pentaerythritol tetrakismercaptopropionate, bis(mercaptomethyl)sulfide, bis(mercaptomethyl)disulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane, and esters of these compounds with thioglycolic acids and mercaptopropionic acid, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), tris(mercaptomethylthio)methane, tris(mercaptoethylthio)methane;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, 2,6-naphthalenedithiol; and heterocyclic polythiol compounds such as 2-methyl amino-4,6-dithiol-sym-triazine, 3,4-thiophenedithiol, bismuthiol.

Moreover, oligomers and halogen-substituted products such as a chlorine-substituted product and a bromine-substituted product of these polythiol compounds, other thiol compounds, or other polythiol compounds may be used as other thiol compounds or other polythiol compounds. These compounds can be used as single or in combination of two or more kinds thereof.

Further, the phenylene diisocyanate, and other isocyanate compounds used in the present invention (hereinafter referred to the generic term "isocyanate compounds") can be used as ones obtained by preliminarily reacting with parts of a predetermined polythiol compound and other (poly)thiol compound (hereinafter referred to by the generic term "thiols"). Further, the thiols used in the present invention can be used ones obtained by preliminarily reacting with parts of the isocyanate compounds.

Moreover, for the purpose of modification of the resin, a resin modifier of an olefin compound and the like such as a hydroxyl compound, an epoxy compound, an episulfide compound, an organic acid, and an anhydride thereof, a (meth) acrylate compound may be added. Here, the resin modifier is a compound which controls or improves physical properties of materials comprised of a thiourethane resin such as a refractive index, an Abbe number, a heat resistance, a specific gravity, and the like, and mechanical strength such as impact resistance, and the like.

When the isocyanate compounds, the thiols and the resin modifier are used in the present invention, the used amount of a hydroxyl compound (hereinafter referred to as the "active hydrogen compounds") respectively, are appropriately determined by the refractive index, the strength, and the like of an optical material.

Further, the polymerizable composition comprised of the phenylene diisocyanate and a predetermined polythiol compound as described in the present invention can contain a bluing agent, if necessary. The bluing agent has an absorption band in the wavelength range from an orange region through to a yellow red region in a visible ray region, and has a function to control the color of an optical material comprised of the resin. The bluing agent further specifically contains a material exhibiting a blue color to a violet color.

The bluing agent used in the polymerizable composition of the present invention is not particularly limited, but specific examples thereof include a dye, a fluorescent whitening agent, a fluorescent pigment, an inorganic pigment, and the like. The bluing agent should be appropriately selected according to the physical properties required for an optical component, the resin color, or the like. These bluing agents may be each used as single or in combination of two or more kinds thereof.

Among these bluing agents, a dye is preferred from the viewpoint of the solubility in the polymerizable composition and the transparency of the obtained optical material. Among the dyes, a dye containing one or two or more kinds selected from blue and violet dyes are preferred, but a mixture of dyes having other colors may be used as occasion may demand. For example, in addition to the blue and violet dyes, a gray, brown, red, or orange dye can also be used. Specific examples of a combination of such bluing agents include a combination of a blue dye and a red dye, a combination of a violet dye and a red dye, and others.

From the viewpoint of absorption wavelength, a dye having a maximum absorption wavelength of 520 nm to 600 nm is preferred, and a dye having a maximum absorption wavelength of 540 nm to 580 nm is more preferred.

Further, from the viewpoint of the structure of the compound, an anthraquinone dye is preferred.

Specific examples of the dye include "PS Blue RR", "PS Violet RC", "PET Blue 2000", "PS Brilliant Red HEY", and "MLP RED V-1" (each of which is a product name of Dystar Japan Ltd.), "Plast Blue 8514", and "Plast Red 8380" (each of which is a product name of Arimoto Chemical Co., Ltd.), and the like.

The used amount of the bluing agent is determined by the kind of the monomer, the presence or absence of the use of various additives, the kind or amount of the used additive, the polymerization method, or the polymerization condition. It is generally used at a ratio of 0.001 ppm to 500 ppm, preferably at a ratio of 0.005 ppm to 100 ppm, and more preferably at a ratio of 0.01 ppm to 10 ppm, based on the total amount of the monomers used, that is, the total weight of the polymerizable compound contained in the polymerization composition. If the amount of the bluing agent added is too high, the optical component expresses a blue color too much, which is thus unfavorable in some cases, whereas if the amount is too low, the effect of improvement in the color is not sufficiently exhibited, which is thus unfavorable, in some cases.

The method for adding a bluing agent is not particularly limited, but a method in which a bluing agent is preliminarily added to monomers is preferred. As such a method, various methods such as a method for dissolving in a monomer, a method for preparing a master solution containing a high concentration of a bluing agent, and adding the master solution as diluted with the monomers or other additives used, and other methods can be employed.

The composition containing phenylene diisocyanate and a predetermined polythiol compound as essential components as described above has such viscosity as to not interfere with the handleability. As used herein, the viscosity can be evaluated, for example, as a viscosity of a monomer mixture at a temperature upon mixing as measured with a B type viscometer. In the present invention, a viscosity ranging from immediately after the composition is prepared to all of the monomers are completely injected after performing a defoaming treatment under reduced pressure and other processes are important. From the viewpoint of good handleability, for example, the viscosity immediately after preparing of the composition is 100 mPa·s or less, preferably 50 mPa·s or less, and more preferably 30 mPa·s or less. Further, in the case where an optical material is molded by the cast polymerization as described below, the viscosity upon injection, as a value measured at a temperature upon injection, is preferably 200 mPa·s or less, and particularly, in order to prepare a lens having a very small thickness in the center, an even lower viscosity, for example, a viscosity of 100 mPa·s or less is more preferable. The temperatures upon mixing and injection are appropriately determined according to the monomer components added.

Further, the present invention provides an optical material obtained by curing the polymerizable composition for the optical material as described above.

Such an optical material has inhibited coloration, and has good color. As used herein, the color can be evaluated as a resin color YI value (hereinafter referred to as "YI").

The refractive index of the optical material can be controlled according to the kind of the thiols and the compositional ratio of the isocyanate compounds and the thiols in the polymerizable composition, and the like, as desired. Particularly, a high refractive index is required for the optical material of the present invention. From such a viewpoint, for example, in the case where the polythiol compound A (main component: 1,1,3,3-tetrakis(mercaptomethylthio)propane) as described in Preparative Example 1 below is used as the thiol compound, an optical material, which a refractive index measured with an e-beam is usually 1.70 or more, preferably 1.73 or more, and more preferably 1.735 or more, can be obtained.

Further, from other viewpoints, a method for preparing the optical material including curing the polymerizable composition, for example, a method for preparing the optical material, including molding the polymerizable composition by cast polymerization using a lens-casting mold is provided.

When a mixture of the isocyanate compounds and the thiols, which is the polymerizable composition for an optical material as described above, is cured and molded, if necessary, in the same manner as the technologies in the conventional molding methods, substances including a catalyst such as dibutyltin dichloride, dimethyltin dichloride, an ultraviolet absorbent such as benzotriazoles, internal mold release agents such as an acidic phosphoric ester, light stabilizers, antioxidants, reaction initiators such as a radical reaction initiators, chain extending agents, crosslinking agents, coloration inhibitors, oil-soluble dyes, fillers, and the like, may be added.

From the viewpoints of the color, the light resistance, the impact resistance, and the yellowing-resistance against heat of the resin, it is preferable to use the compound represented by the general formula (1) or the compound represented by the general formula (2), which may be each used as single or in a mixture of two or more kinds thereof, as the polymerization catalyst.

By using the compound represented by the general formula (1) and/or the compound represented by the general formula (2), the color, the light resistance, the impact resistance, and the yellowing-resistance against heat of the obtained plastic lens are improved.

M in the compound represented by the general formula (1) represents a metal, and represents Al, Fe, Cu, Zn, Zr or Bi. M is preferably Al, Fe, Zr or Zn and further preferably Zn or Fe.

In the compound represented by the general formula (1), L represents a dithiocarbamic acid group, a sulfonic acid group, a mono- or di-alkyl phosphoric acid ester group, a substituted acetylacetonato group or a halogen. L is preferably a dithiocarbamic acid group, a substituted acetylacetonato group or a halogen and further preferably a dithiocarbamic acid group.

As the dithiocarbamic acid group, L of a group represented by the general formula (5) is a more preferred embodiment,

wherein, in the group represented by the general formula (5), $R^8$ and $R^9$ each represent an alkyl group having 1 to 10 carbon atoms, a phenylalkyl group having 7 to 10 carbon atoms or an aryl group having 6 to 10 carbon atoms, and may be the same or different; and $R^8$ and $R^9$ may be bonded with each other to form a ring.

Herein, concrete examples of the alkyl group having 1 to 10 carbon atoms include alkyl groups such as a methyl group, an ethyl group, a propyl group, a butyl group, a pentyl group, a hexyl group, a heptyl group, an octyl group, a nonyl group, a decyl group and the like. Concrete examples of the phenylalkyl group having 7 to 10 carbon atoms include a benzyl group, a phenylethyl group, a phenylpropyl group and a phenylbutyl group. Concrete examples of the aryl group having 6 to 10 carbon atoms include aryl groups such as a phenyl group, a tolyl group, a xylyl group, a mesityl group, a naphthyl group and the like. Furthermore, $R^8$ and $R^9$ may be bonded with each other to form a pyrrolidine ring or a piperidine ring.

Examples of the group represented by the general formula (5) include dithiocarbamic acid groups of the following dithiocarbamic acids. Concrete examples thereof include dithiocarbamic acids such as N,N-dimethyldithiocarbamic acid, N,N-diethyldithiocarbamic acid, N,N-dipropyldithiocarbamic acid, N,N-dibutyldithiocarbamic acid, N-ethyl-N-phenyldithiocarbamic acid, N,N-dibenzyldithiocarbamic acid and the like, and derivatives thereof.

Examples of the sulfonic acid group include sulfonic acid groups of the following sulfonic acids. Concrete examples thereof include sulfonic acids such as methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, decanesulfonic acid, undecanesulfonic acid, dodecanesulfonic acid, tetradecanesulfonic acid, hexadecanesulfonic acid, benzenesulfonic acid, toluenesulfonic acid, dodecylbenzenesulfonic acid, trifluoromethanesulfonic acid, fluorosulfonic acid and the like, and derivatives thereof.

Examples of an ester alkyl group of the mono- or di-alkyl phosphoric acid ester group include the following alkyl groups. Concrete examples thereof include alkyl groups such as a methyl group, an ethyl group, a propyl group, a butyl group, a dipentyl group, a hexyl group, a heptyl group, an octyl group, a decyl group, a dodecyl group, a tetradecyl group, a dihexadecyl group and the like; oxyethylene groups such as a methoxyethyl group, an ethoxyethyl group, a propoxyethyl group, a butoxyethyl group and the like; and polyoxyethylene groups. Ester alkyl groups of dialkyl phosphoric acid ester may be the same or different.

Examples of the substituted acetylacetonato group include 2,2,6,6-tetramethyl-3,5-heptanedionato groups.

Examples of halogen include fluorine, chlorine, bromine and iodine.

When one or two or more isocyanates selected from the group consisting of isocyanate compounds and isothiocyanate compounds are reacted with one or two or more active hydrogen compounds each having a mercapto group to produce polythiourethane optical materials, preferred examples of the aforementioned compound represented by the general formula (1) include iron dialkyldithiocarbamates, copper dialkyldithiocarbamates, zinc dialkyldithiocarbamates, zinc alkyl phenyl dithiocarbamates, zinc diaryldithiocarbamates, iron acetylacetonato, copper acetylacetonato and zinc acetylacetonato, and further preferably zinc N,N-dimethyldithiocarbamate, zinc N,N-diethyldithiocarbamate, zinc N,N-di-n-butyldithiocarbamate, zinc N-ethyl-N-phenyldithiocarbamate and zinc N,N-dibenzyldithiocarbamate. These compounds of the general formula (1) can be used singly, or two or more compounds can be used in combination.

Furthermore, in view of the solubility into a monomer of isocyanates, active hydrogen compounds and the like or resin properties that are required as a plastic spectacle lens of the generated resin, among the foregoing compounds, more preferred are zinc N,N-dimethyldithiocarbamate, zinc N,N-diethyldithiocarbamate and zinc N,N-di-n-butyldithiocarbamate, particularly preferred is zinc N,N-di-n-butyldithiocarbamate. When these compounds are used as catalysts, it is possible to provide a plastic lens in which the color, the light resistance, the impact resistance and the yellowing-resistance against heat are improved.

The compound represented by the general formula (1) can be contained in the polymerizable composition for polythiourethane optical materials without using tertiary amine having strong activity with much less amount of the compound added than that of the conventional organotin catalyst. The polythiourethane resin obtained by curing the polymerizable composition satisfactorily meets the property requirements for optical materials. Furthermore, a sufficient pot life can be secured until the composition is injected into a mold, and the light resistance of the obtained resin is particularly excellent. Therefore, the catalyst can be available as a novel catalyst replacing the organotin catalyst.

Examples of $R^1$, $R^2$, $R^3$ and $R^4$ in the compound represented by the general formula (2) include hydrogen or monovalent or higher valent organic residues derived from linear aliphatic compounds such as methane, ethane, propane, butane, pentane, hexane, heptane, octane, nonane, decane, undecane, dodecane, tetradecane, hexadecane, octadecane, ethylene, propylene, 1-butene, 2-butene, butadiene and the like;

monovalent or higher valent organic residues derived from cyclic aliphatic compounds such as cyclopentane, cyclopentene, cyclopentadiene, cyclohexane, 1,2-dimethylcyclohexane, 1,3-dimethylcyclohexane, 1,4-dimethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, bis(4-methylcyclohexyl)methane and the like;

monovalent or higher valent organic residues derived from aromatic compounds such as benzene, toluene, o-xylene, m-xylene, p-xylene, naphthalene, biphenyl, anthracene, perylene, styrene, ethylbenzene and the like;

monovalent or higher valent organic residues derived from alcohol compounds such as methanol, ethanol, propanol, isopropanol, butanol, isobutanol, pentanol, hexanol, heptanol, octanol, nonanol, decanol, undecanol, dodecanol and the like;

monovalent or higher valent organic residues derived from primary amine compounds such as ethylamine, n-propylamine, isopropylamine, n-butylamine, sec-butylamine, ter-butylamine, pentylamine, hexylamine, heptylamine, octylamine, decylamine, laurylamine, myristylamine, 3-pentylamine, 2-ethylhexylamine, 1,2-dimethylhexylamine and the like;

monovalent or higher valent organic residues derived from secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine and the like; and monovalent or higher valent organic residues derived from tertiary amine compounds such as triethylamine, tri n-butylamine, tri n-hexylamine, N,N-diisopropylethylamine, triethylene diamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine, N-methyldibenzylamine and the like. Furthermore, $R^1$, $R^2$, $R^3$ and $R^4$ may be bonded with each other to form a ring.

Furthermore, it is more preferable that the aforementioned $R^1$, $R^2$, $R^3$ and $R^4$ are each independently an alkyl group having 1 to 18 carbon atoms, a hydroxyalkyl group having 1 to 18 carbon atoms or an aminoalkyl group having 1 to 18 carbon atoms.

Examples of X in the general formula (2) include organic acid groups derived from organic acids such as formic acid, acetic acid, propionic acid, butanoic acid, 2-ethylhexanoic acid, oxalic acid, tartaric acid, succinic acid, fumaric acid, maleic acid, lactic acid, benzoic acid, citric acid, benzenesulfonic acid, toluenesulfonic acid, methanesulfonic acid, phosphoric ester, tetraphenyl boron and the like, and derivatives thereof; and inorganic acid groups derived from inorganic acids such as hydrohalogen acid, perchloric acid, carbonic acid, hydrocarbonic acid, sulfuric acid, phosphoric acid, boric acid and the like.

When Y in the general formula (2) is a nitrogen atom, concrete examples of the compound of the general formula (2) include quaternary ammonium salt compounds each having an alkyl group such as tetramethylammonium chloride, tetraethylammonium chloride, tetrapropylammonium chloride, tetrabutylammonium chloride, tetrahexylammonium chloride, tetraoctylammonium chloride, trimethyloctylammonium chloride, trimethylphenylammonium chloride, trimethylbenzylammonium chloride, triethyl-n-octylammonium chloride, triethylbenzylammonium chloride, tri-n-butyl-n-octylammonium chloride, tri-n-butylbenzylammonium chloride, methyl triphenylammonium chloride, ethyl triphenylammonium chloride, n-butyl triphenylammonium chloride, trimethylcetylammonium chloride, trimethylstearylammonium chloride, dimethylethylcetylammonium chloride, dimethyl didecylammonium chloride, dimethyl di-n-dodecylammonium chloride, dimethyl distearylammonium chloride, n-octyl dimethylbenzylammonium chloride, n-dodecyl dimethylbenzylammonium chloride, stearyl dimethylbenzylammonium chloride, triethyl-n-dodecylammonium chloride, tri-n-hexylmethylammonium chloride, tri-n-octylmethylammonium chloride, tri-n-decylmethylammonium chloride, tri-n-dodecylmethylammonium chloride, tri-n-octyl-n-dodecylammonium chloride, diethyl dicyclohexylammonium chloride, 1-methylpyridinium chloride, 1-ethylpyridinium chloride, 1-n-butylpyridinium chloride, 1-n-hexylpyridinium chloride, 1-n-octylpyridinium chloride, 1-n-dodecylpyridinium chloride, 1-phenylpyridinium chloride, 1-methyl-4-methylpyridinium chloride, 1-ethyl-4-methylpyridiniumchloride, 1-n-butyl-4-methylpyridinium chloride, 1-n-hexyl-4-methylpyridinium chloride, 1-n-octyl-4-methylpyridinium chloride, 1-n-dodecyl-4-methylpyridinium chloride, 1-phenyl-4-methylpyridinium chloride, tetramethylammonium bromide, tetraethylammonium bromide, tetrapropylammonium bromide, tetrabutylammonium bromide, tetrahexylammonium bromide, tetraoctylammonium bromide, trimethyloctylammonium bromide, trimethylphenylammonium bromide, trimethylbenzylammonium bromide, triethyl-n-octylammonium bromide, triethylbenzylammonium bromide, tri-n-butyl-n-octylammonium bromide, tri-n-butylbenzylammonium bromide, methyl triphenylammonium bromide, ethyl triphenylammonium bromide, n-butyl triphenylammonium bromide, trimethylcetylammonium bromide, trimethylstearylammonium bromide, dimethylethylcetylammonium bromide, dimethyl didecylammonium bromide, dimethyl di-n-dodecylammonium bromide, dimethyl distearylammonium bromide, n-octyl dimethyl benzylammonium bromide, n-dodecyl dimethyl benzylammonium bromide, stearyl dimethyl benzylammonium bromide, triethyl-n-dodecylammonium bromide, tri-n-hexylmethylammonium bromide, tri-n-octylmethylammonium bromide, tri-n-decylmethylammonium bromide, tri-n-dodecylmethylammonium bromide, tri-n-octyl-n-dodecylammonium bromide, diethyl dicyclohexylammonium bromide, 1-methylpyridinium bromide, 1-ethylpyridinium bromide, 1-n-butylpyridinium bromide, 1-n-hexylpyridinium bromide, 1-n-octylpyridinium bromide, 1-n-dodecylpyridinium bromide, 1-phenylpyridinium bromide, 1-methyl-4-methylpyridinium bromide, 1-ethyl-4-methylpyridinium bromide, 1-n-butyl-4-methylpyridinium bromide, 1-n-hexyl-4-methylpyridinium bromide, 1-n-octyl-4-methylpyridinium bromide, 1-n-dodecyl-4-methylpyridinium bromide, 1-phenyl-4-methylpyridinium bromide, tetramethylammonium fluoride, tetraethylammonium fluoride, tetrapropylammonium fluoride, tetrabutylammonium fluoride, tetrahexylammonium fluoride, tetraoctylammonium fluoride, trimethyloctylammonium fluoride, trimethylphenylammonium fluoride, trimethylbenzylammonium fluoride, triethyl-n-octylammonium fluoride, triethylbenzylammonium fluoride, tri-n-butyl-n-octylammonium fluoride, tri-n-butylbenzylammonium fluoride, methyl triphenylammonium fluoride, ethyl triphenylammonium fluoride, n-butyl triphenylammonium fluoride, trimethylcetylammonium fluoride, trimethylstearylammonium fluoride, dimethylethylcetylammonium fluoride, dimethyl didecylammonium fluoride, dimethyl di-n-dodecylammonium fluoride, dimethyl distearylammonium fluoride, n-octyl dimethyl benzylammonium fluoride, n-dodecyl dimethyl benzylammonium fluoride, stearyl dimethyl benzylammonium fluoride, triethyl-n-dodecylammonium fluoride, tri-n-hexylmethylammonium fluoride, tri-n-octylmethylammonium fluoride, tri-n-decylmethylammonium fluoride, tri-n-dodecylmethylammonium fluoride, tri-n-octyl-n-dodecylammonium fluoride, diethyl dicyclohexylammonium fluoride, 1-methylpyridinium fluoride, 1-ethylpyridinium fluoride, 1-n-butylpyridinium fluoride, 1-n-hexylpyridinium fluoride, 1-n-octylpyridinium fluoride, 1-n-dodecylpyridinium fluoride, 1-phenylpyridinium fluoride, 1-methyl-4-methylpyridinium fluoride, 1-ethyl-4-methylpyridinium fluoride, 1-n-butyl-4-methylpyridinium fluoride, 1-n-hexyl-4-methylpyridinium fluoride, 1-n-octyl-4-methylpyridinium fluoride, 1-n-dodecyl-4-methylpyridinium fluoride, 1-phenyl-4-methylpyridinium fluoride, tetramethylammonium iodide, tetraethylammonium iodide, tetrapropylammonium iodide, tetrabutylammonium iodide, tetrahexylammonium iodide, tetraoctylammonium iodide, trimethyloctylammonium iodide, trimethylphenylammonium iodide, trimethylbenzylammonium iodide, triethyl-n-octylammonium iodide, triethylbenzylammonium iodide, tri-n-butyl-n-octylammonium iodide, tri-n-butylbenzylammonium iodide, methyl triphenylammonium iodide, ethyl triphenylammonium iodide, n-butyl triphenylammonium iodide, trimethylcetylammonium iodide, trimethylstearylammonium iodide, dimethylethylcetylammonium iodide, dimethyl didecylammonium iodide, dimethyl di-n-dodecylammonium iodide, dimethyl distearylammonium iodide, n-octyl dimethyl benzylammonium iodide, n-dodecyl dimethyl benzylammonium iodide, stearyl dimethyl benzylammonium iodide, triethyl-n-dodecylammonium iodide, tri-n-hexylmethylammonium iodide, tri-n-octylmethylammonium iodide, tri-n-decylmethylammonium iodide, tri-n-dodecylmethylammonium iodide, tri-n-octyl-n-dodecylammonium iodide, diethyl dicyclohexylammonium iodide, 1-methylpyridinium iodide, 1-ethylpyridinium iodide, 1-n-butylpyridinium iodide, 1-n-hexylpyridinium iodide, 1-n-octylpyridinium iodide, 1-n-dodecylpyridinium iodide, 1-phenylpyridinium iodide, 1-methyl-4-methylpyridinium iodide, 1-ethyl-4-methylpyridinium iodide, 1-n-butyl-4-methylpyridinium iodide, 1-n-hexyl-4-methylpyridinium iodide, 1-n-octyl-4-methylpyridinium iodide, 1-n-dodecyl-4-methylpyridinium iodide, 1-phenyl-4-methylpyridinium iodide, tetramethylammonium hydroxide, tetraethylammonium hydroxide, tetrabutylammonium hydroxide, tetrapropylammonium hydroxide, tetrahexylammonium hydroxide, tetraoctylammonium hydroxide, trimethyloctylammonium hydroxide, trimethylphenylammonium hydroxide, trimethylbenzylammonium hydroxide, triethyl-n-octylammonium hydroxide, triethylbenzylammonium hydroxide, tri-n-butyl-n-octylammonium hydroxide, tri-n-butylbenzylammonium hydroxide, methyl triphenylammonium hydroxide, ethyl triphenylammonium hydroxide, n-butyl triphenylammonium hydroxide, trimethylcetylammonium hydroxide, trimethylstearylammonium hydroxide, dimethylethylcetylammonium hydroxide, dimethyl didecylammonium hydroxide, dimethyl di-n-dodecylammonium hydroxide, dimethyl distearylammonium hydroxide, n-octyl dimethyl benzylammonium hydroxide, n-dodecyl dimethyl benzylammonium hydroxide, stearyl dimethyl benzylammonium hydroxide, triethyl-n-dodecylammonium hydroxide, tri-n-hexylmethylammonium hydroxide, tri-n-octylmethylammonium hydroxide, tri-n-decylmethylammonium hydroxide, tri-n-dodecylmethylammonium hydroxide, tri-n-octyl-n-dodecylammonium hydroxide, diethyl dicyclohexylammonium hydroxide, 1-methylpyridinium hydroxide, 1-ethylpyridinium hydroxide, 1-n-butylpyridinium hydroxide, 1-n-hexylpyridinium hydroxide, 1-n-octylpyridinium hydroxide, 1-n-dodecylpyridinium hydroxide, 1-phenylpyridinium hydroxide, 1-methyl-4-methylpyridinium hydroxide, 1-ethyl-4-methylpyridinium hydroxide, 1-n-butyl-4-methylpyridinium hydroxide, 1-n-hexyl-4-methylpyridinium hydroxide, 1-n-octyl-4-methylpyridinium hydroxide, 1-n-dodecyl-4-methylpyridinium hydroxide, 1-phenyl-4-methylpyridinium hydroxide, tetramethylammonium tetrafluoroborate, tetraethylammonium tetrafluoroborate, tetrapropylammonium tetrafluoroborate, tetrabutylammonium tetrafluoroborate, tetrahexylammonium tetrafluoroborate, tetraoctylammonium tetrafluoroborate, trimethyloctylammonium tetrafluoroborate, trimethylphenylammonium tetrafluoroborate, trimethylbenzylammonium tetrafluoroborate, triethyl-n-octylammonium tetrafluoroborate, triethylbenzylammonium tetrafluoroborate, tri-n-butyl-n-octylammonium tetrafluoroborate, tri-n-butylbenzylammonium tetrafluoroborate, methyl triphenylammonium tetrafluoroborate, ethyl triphenylammonium tetrafluoroborate, n-butyl triphenylammonium tetrafluoroborate, trimethylcetylammonium tetrafluoroborate, trimethylstearylammonium tetrafluoroborate, dimethylethylcetylammonium tetrafluoroborate, dimethyl didecylammonium tetrafluoroborate, dimethyl di-n-dodecylammonium tetrafluoroborate, dimethyl distearylammonium tetrafluoroborate, n-octyl dimethyl benzylammonium tetrafluoroborate, n-dodecyl dimethyl benzylammonium tetrafluoroborate, stearyl dimethyl benzylammonium tetrafluoroborate, triethyl-n-dodecylammonium tetrafluoroborate, tri-n-hexylmethylammonium tetrafluoroborate, tri-n-octylmethylammonium tetrafluoroborate, tri-n-decylmethylammonium tetrafluoroborate, tri-n-dodecylmethylammonium tetrafluoroborate, tri-n-octyl-n-dodecylammonium tetrafluoroborate, diethyl dicyclohexylammonium tetrafluoroborate, 1-methylpyridinium tetrafluoroborate, 1-ethylpyridinium tetrafluoroborate, 1-n-butylpyridinium tetrafluoroborate, 1-n-hexylpyridinium tetrafluoroborate, 1-n-octylpyridinium tetrafluoroborate, 1-n-dodecylpyridinium tetrafluoroborate, 1-phenylpyridinium tetrafluoroborate, 1-methyl-4-methylpyridinium tetrafluoroborate, 1-ethyl-4-methylpyridinium tetrafluoroborate, 1-n-butyl-4-methylpyridinium tetrafluoroborate, 1-n-hexyl-4-methylpyridinium tetrafluoroborate, 1-n-octyl-4-methylpyridinium tetrafluoroborate, 1-n-dodecyl-4-methylpyridinium tetrafluoroborate, 1-phenyl-4-methylpyridinium tetrafluoroborate, tetramethylammonium hexafluorophosphate, tetraethylammonium hexafluorophosphate, tetrapropylammonium hexafluorophosphate, tetrabutylammonium hexafluorophosphate, tetrahexylammonium hexafluorophosphate, tetraoctylammonium hexafluorophosphate, trimethyloctylammonium hexafluorophosphate, trimethylphenylammonium hexafluorophosphate, trimethylbenzylammonium hexafluorophosphate, triethyl-n-octylammonium hexafluorophosphate, triethylbenzylammonium hexafluorophosphate, tri-n-butyl-n-octylammonium hexafluorophosphate, tri-n-butylbenzylammonium hexafluorophosphate, methyl triphenylammonium hexafluorophosphate, ethyl triphenylammonium hexafluorophosphate, n-butyl triphenylammonium hexafluorophosphate, trimethylcetylammonium hexafluorophosphate, trimethylstearylammonium hexafluorophosphate, dimethylethylcetylammonium hexafluorophosphate, dimethyl didecylammonium hexafluorophosphate, dimethyl di-n-dodecylammonium hexafluorophosphate, dimethyl distearylammonium hexafluorophosphate, n-octyl dimethyl benzylammonium hexafluorophosphate, n-dodecyl dimethyl benzylammonium hexafluorophosphate, stearyl dimethyl benzylammonium hexafluorophosphate, triethyl-n-dodecylammonium hexafluorophosphate, tri-n-hexylmethylammonium hexafluorophosphate, tri-n-octylmethylammonium hexafluorophosphate, tri-n-decylmethylammonium hexafluorophosphate, tri-n-dodecylmethylammonium hexafluorophosphate, tri-n-octyl-n-dodecylammonium hexafluorophosphate, diethyl dicyclohexylammonium hexafluorophosphate, 1-methylpyridinium hexafluorophosphate, 1-ethylpyridinium hexafluorophosphate, 1-n-butylpyridinium hexafluorophosphate, 1-n-hexylpyridinium hexafluorophosphate, 1-n-octylpyridinium hexafluorophosphate, 1-n-dodecylpyridinium hexafluorophosphate, 1-phenylpyridinium hexafluorophosphate, 1-methyl-4-methylpyridinium hexafluorophosphate, 1-ethyl-4-methylpyridinium hexafluorophosphate, 1-n-butyl-4-methylpyridinium hexafluorophosphate, 1-n-hexyl-4-methylpyridinium hexafluorophosphate, 1-n-octyl-4-methylpyridinium hexafluorophosphate, 1-n-dodecyl-4-methylpyridinium hexafluorophosphate, 1-phenyl-4-methylpyridinium hexafluorophosphate, p-toluenesulfonic acid tetramethylammonium, p-toluenesulfonic acid tetraethylammonium, p-toluenesulfonic acid tetrapropylammonium, p-toluenesulfonic acid tetrabutylammonium, p-toluenesulfonic acid tetrahexylammonium, p-toluenesulfonic acid tetraoctylammonium, p-toluenesulfonic acid trimethyloctylammonium, p-toluenesulfonic acid trimethylphenylammonium, p-toluenesulfonic acid trimethylbenzylammonium, p-toluenesulfonic acid triethyl-n-octylammonium, p-toluenesulfonic acid triethylbenzylammonium, p-toluenesulfonic acid tri-n-butyl-n-octylammonium, p-toluenesulfonic acid tri-n-butylbenzylammonium, p-toluenesulfonic acid methyl triphenylammonium, p-toluenesulfonic acid ethyl triphenylammonium, p-toluenesulfonic acid n-butyl triphenylammonium, p-toluenesulfonic acid trimethylcetylammonium, p-toluenesulfonic acid trimethylstearylammonium, p-toluenesulfonic acid dimethylethylcetylammonium, p-toluenesulfonic acid dimethyl didecylammonium, p-toluenesulfonic acid dimethyl di-n-dodecylammonium, dimethyl distearylammonium, p-toluenesulfonic acid n-octyl dimethyl benzylammonium, p-toluenesulfonic acid n-dodecyl dimethyl benzylammonium, p-toluenesulfonic acid stearyl dimethyl benzylammonium, p-toluenesulfonic acid triethyl-n-dodecylammonium, p-toluenesulfonic acid tri-n-hexylmethylammonium, p-toluenesulfonic acid tri-n-octylmethylammonium, p-toluenesulfonic acid tri-n-decylmethylammonium, p-toluenesulfonic acid tri-n-dodecylmethylammonium, p-toluenesulfonic acid tri-n-octyl-n-dodecylammonium, p-toluenesulfonic acid diethyl dicyclohexylammonium, p-toluenesulfonic acid 1-methylpyridinium, p-toluenesulfonic acid 1-ethylpyridinium, p-toluenesulfonic acid 1-n-butylpyridinium, p-toluenesulfonic acid 1-n-hexylpyridinium, p-toluenesulfonic acid 1-n-octylpyridinium, p-toluenesulfonic acid 1-n-dodecylpyridinium, p-toluenesulfonic acid 1-phenylpyridinium, p-toluenesulfonic acid 1-methyl-4-methylpyridinium, p-toluenesulfonic acid 1-ethyl-4-methylpyridinium, p-toluenesulfonic acid 1-n-butyl-4-methylpyridinium, p-toluenesulfonic acid 1-n-hexyl-4-methylpyridinium, p-toluenesulfonic acid 1-n-octyl-4-methylpyridinium, p-toluenesulfonic acid 1-n-dodecyl-4-methylpyridinium, p-toluenesulfonic acid 1-phenyl-4-methylpyridinium, perchloric acid tetramethylammonium, perchloric acid tetraethylammonium, perchloric acid tetrapropylammonium, perchloric acid tetrabutylammonium, perchloric acid tetrahexylammonium, perchloric acid tetraoctylammonium, perchloric acid trimethyloctylammonium, perchloric acid trimethylphenylammonium, perchloric acid trimethylbenzylammonium, perchloric acid triethyl-n-octylammonium, perchloric acid triethylbenzylammonium, perchloric acid tri-n-butyl-n-octylammonium, perchloric acid tri-n-butylbenzylammonium, perchloric acid methyl triphenylammonium, perchloric acid ethyl triphenylammonium, perchloric acid n-butyl triphenylammonium, perchloric acid trimethylcetylammonium, perchloric acid trimethylstearylammonium, perchloric acid dimethylethylcetylammonium, perchloric acid dimethyl didecylammonium, perchloric acid dimethyl di-n-dodecylammonium, dimethyl distearylammonium, perchloric acid n-octyl dimethyl benzylammonium, perchloric acid n-dodecyl dimethyl benzylammonium, perchloric acid stearyl dimethyl benzylammonium, perchloric acid triethyl-n-dodecylammonium, perchloric acid tri-n-hexylmethylammonium, perchloric acid tri-n-octylmethylammonium, perchloric acid tri-n-decylmethylammonium, perchloric acid tri-n-dodecylmethylammonium, perchloric acid tri-n-octyl-n-dodecylammonium, perchloric acid diethyl dicyclohexylammonium, perchloric acid 1-methylpyridinium, perchloric acid 1-ethylpyridinium, perchloric acid 1-n-butylpyridinium, perchloric acid 1-n-hexylpyridinium, perchloric acid 1-n-octylpyridinium, perchloric acid 1-n-dodecylpyridinium, perchloric acid 1-phenylpyridinium, perchloric acid 1-methyl-4-methylpyridinium, perchloric acid 1-ethyl-4-methylpyridinium, perchloric acid 1-n-butyl-4-methylpyridinium, perchloric acid 1-n-hexyl-4-methylpyridinium, perchloric acid 1-n-octyl-4-methylpyridinium, perchloric acid 1-n-dodecyl-4-methylpyridinium, perchloric acid 1-phenyl-4-methylpyridinium and the like;

quaternary ammonium salt compounds each having a hydroxyalkyl group such as (2-hydroxypropyl)trimethylammonium chloride, hydroxyethyl trimethylammonium chloride, trimethylaminoethoxyethanol chloride, (2-hydroxypropyl)trimethylammonium bromide, hydroxyethyl trimethylammonium bromide, trimethylaminoethoxyethanol bromide, (2-hydroxypropyl)trimethylammonium fluoride, hydroxyethyl trimethylammonium fluoride, trimethylaminoethoxyethanol fluoride, (2-hydroxypropyl)trimethylammonium iodide, hydroxyethyl trimethylammonium iodide, trimethylaminoethoxyethanol iodide, (2-hydroxypropyl) trimethylammonium hydroxide, hydroxyethyl trimethylammonium hydroxide, trimethylaminoethoxyethanol hydroxide, (2-hydroxypropyl)trimethylammonium tetrafluoroborate, hydroxyethyl trimethylammonium tetrafluoroborate, trimethylaminoethoxyethanol tetrafluoroborate, (2-hydroxypropyl)trimethylammonium hexafluorophosphate, hydroxyethyl trimethylammonium phosphate, trimethylaminoethoxyethanol phosphate, p-toluenesulfonic acid (2-hydroxypropyl)trimethylammonium, p-toluenesulfonic acid hydroxyethyl trimethylammonium, p-toluenesulfonic acid trimethylaminoethoxyethanol, perchloric acid(2-hydroxypropyl)trimethylammonium, perchloric acid hydroxyethyl trimethylammonium, perchloric acid trimethylaminoethoxyethanol and the like; and quaternary ammonium compounds each having an aminoalkyl group such as 1-methyl-1-azania-4-azabicyclo[2,2,2]octanium chloride, 1,1-dimethyl-4-methylpiperidinium chloride, 1-methylmorpholinium, 1-methylpiperidinium chloride, 1-methyl-1-azania-4-azabicyclo[2,2,2]octanium bromide, 1,1-dimethyl-4-methylpiperidinium, 1-methylmorpholinium bromide, 1-methylpiperidinium bromide, 1-methyl-1-azania-4-azabicyclo[2,2,2]octanium fluoride, 1,1-dimethyl-4-methylpiperidinium fluoride, 1-methylmorpholinium fluoride, 1-methylpiperidinium fluoride, 1-methyl-1-azania-4-azabicyclo[2,2,2]octanium iodide, 1,1-dimethyl-4-methylpiperidinium iodide, 1-methylmorpholinium iodide, 1-methylpiperidinium iodide, 1-methyl-1-azania-4-azabicyclo[2,2,2]octanium hydroxide, 1,1-dimethyl-4-methylpiperidinium hydroxide, 1-methylmorpholinium hydroxide, 1-methylpiperidinium hydroxide, 1-methyl-1-azania-4-azabicyclo[2,2,2]octanium trimethylammonium tetrafluoroborate, 1,1-dimethyl-4-methylpiperidinium trimethylammonium tetrafluoroborate, 1-methylmorpholinium trimethylammonium tetrafluoroborate, 1-methylpiperidinium trimethylammonium tetrafluoroborate, 1-methyl-1-azania-4-azabicyclo[2,2,2]octanium hexafluorophosphate, 1,1-dimethyl-4-methylpiperidinium hexafluorophosphate, 1-methylmorpholinium hexafluorophosphate, 1-methylpiperidinium hexafluorophosphate, p-toluenesulfonic acid 1-methyl-1-azania-4-azabicyclo[2,2,2]octanium, p-toluenesulfonic acid 1,1-dimethyl-4-methylpiperidinium, p-toluenesulfonic acid 1-methylmorpholinium, p-toluenesulfonic acid 1-methylpiperidinium, perchloric acid 1-methyl-1-azania-4-azabicyclo[2,2,2]octanium, perchloric acid 1,1-dimethyl-4-methylpiperidinium, perchloric acid 1-methylmorpholinium, perchloric acid 1-methylpiperidinium and the like.

Furthermore, when Y in the general formula (2) is a phosphorus atom, concrete examples of the compound of the general formula (2) include quaternary phosphonium salt compounds each having an alkyl group such as tetramethylphosphonium chloride, tetraethylphosphonium chloride, tetrapropylphosphonium chloride, tetrabutylphosphonium chloride, tetrahexylphosphonium chloride, tetraoctylphosphonium chloride, ethyl triphenylphosphonium chloride, tetraphenylphosphonium chloride, butyl triphenylphosphonium chloride, benzyl triphenylphosphonium chloride, methoxymethyl triphenylphosphonium chloride, tetramethylphosphonium bromide, tetraethylphosphonium bromide, tetrapropylphosphonium bromide, tetrabutylphosphonium bromide, tetrahexylphosphonium bromide, tetraoctylphosphonium bromide, ethyl triphenylphosphonium bromide, tetraphenylphosphonium bromide, butyl triphenylphosphonium bromide, benzyl triphenylphosphonium bromide, methoxymethyl triphenylphosphonium bromide, ethyl triphenylphosphonium acetate, ethyl triphenylphosphonium iodide, tetraethylphosphonium hydroxide, tetrabutylphosphonium hydroxide, tetraphenylphosphonium tetrakis(4-methylphenyl)borate, tetraphenylphosphonium tetraphenylborate, tetrabutylphosphonium-o,o-diethyl phosphorodithioate and the like; and quaternary ammonium salt compounds each having a hydroxyalkyl group such as tetrahydroxymethylphosphonium sulfate, tetrahydroxyethylphosphonium sulfate and the like.

Of these exemplified compounds, as the compound represented by the general formula (2), preferred are a tetramethylammonium salt, a tetraethylammonium salt, a tetrapropylammonium salt, a tetrabutylammonium salt, a trioctylmethylammonium salt, a tributylbenzylammonium salt, a tetramethylphosphonium salt, a tetraethylphosphonium salt, a tetrapropylphosphonium salt, a tetrabutylphosphonium salt and a methoxymethyl triphenylphosphonium salt, more preferred are tetraethylammonium chloride, tetrabutylammonium fluoride, tetrabutylammonium chloride, tetrabutylammonium bromide, tetrabutylammonium iodide, tetrabutylammonium tetrafluoroborate, trioctylmethylammonium chloride, tributylbenzylammonium chloride, tetrabutylphosphonium chloride, tetrabutylphosphonium bromide and methoxymethyl triphenylphosphonium chloride, and further preferred are tetrabutylammonium chloride, tetrabutylammonium bromide, tetraethylammonium bromide, tetrabutylammonium tetrafluoroborate, trioctylmethylammonium chloride, tributylbenzylammonium chloride, tetrabutylphosphonium chloride and tetrabutylphosphonium bromide. These quaternary ammonium salt compounds and quaternary phosphonium salt compounds may be used singly, or two or more compounds may be used in combination.

By using these compounds as the catalyst, a plastic lens having the improved color, light resistance, impact resistance, and yellowing-resistance against heat can be provided.

Furthermore, among the above-mentioned compounds, trioctylmethyl ammonium chloride is particularly preferred, taking into consideration the solubility of isocyanates, active hydrogen compounds, or the like, in the monomers, or the resin physical properties, which are required as a plastic specular lens comprised of the resulting resin.

In the present invention, the compound represented by the general formula (1) or the compound represented by the general formula (2) can be each used as single or in a mixture of two or more kinds thereof. In the case of using each of them as single, the amount used is generally 0.0005 part by weight to 5 parts by weight, and preferably 0.001 part by weight to 2 parts by weight, based on 100 parts by weight of the total amount of the polyisocyanate compound and the polythiol compound. These amounts used are appropriately determined according to the type of catalyst, the type of monomer used, and the type and amount used of the additive and the shape of the molded product.

Furthermore, in the present invention, when the compound of the general formula (1) and the compound of the general formula (2) are used together, the molar ratio of the compound of the general formula (2) to the compound of the general formula (1) is in the range of 0.01 to 100, preferably in the range of 0.05 to 100, and more preferably in the range of 0.5 to 50. When the molar ratio of the compound of the general formula (2) is within the above range, the catalytic activity of the compound of the general formula (1) is rapidly improved, and sufficient dissolution of the compound of the general formula (2) in the polymerizable composition is secured. Therefore, a resin with high transparency can be obtained.

When the compound of the general formula (1) and the compound of the general formula (2) are used together, the amount of the compound of the general formula (1) and the compound of the general formula (2) used may be such that the total amount of the compound of the general formula (1) and the compound of the general formula (2) is in the range of 0.0005 to 5 weight parts, preferably in the range of 0.0010 to 3 weight parts, and more preferably in the range of 0.0010 to 2 weight parts, based on the total 100 weight parts of one or two or more isocyanates selected from isocyanate compounds and isothiocyanate compounds, and one or two or more active hydrogen compounds each having a thiol group. The amount used is suitably determined depending on the type of catalysts, the type and amount of monomers (isocyanates, active hydrogen compounds, resin modifiers to be described later or the like) and additives in use, and the shape of molded products.

Furthermore, an acidic phosphoric ester can be used as the internal mold release agent from the viewpoint of reduction in the foreign materials or the turbidity in the resin, thereby giving a better appearance. Examples of the acidic phosphoric ester include a phosphoric monoester represented by the following general formula (3) and a phosphoric diester represented by the following general formula (4), each of which can be used as single or in a mixture of two or more kinds thereof.

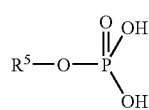

(3)

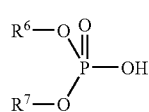

(4)

The phosphoric monoester in the present invention refers to a compound represented by the general formula (3), wherein $R^5$ in the formula represents an aliphatic or aromatic organic residue having 2 to 12 carbon atoms.

Examples of $R^5$ in the general formula (3) include an aliphatic or aromatic organic residue having 2 to 12 carbon atoms, and preferably an organic residue derived from an aliphatic compound, an organic residue derived from a cyclic aliphatic compound, an organic residue derived from an aromatic compound, or the like.

Examples of the organic residue derived from an aliphatic compound include an organic residue derived from a linear aliphatic compound such as methane, ethane, propane, butane, pentane, hexane, heptane, octane, nonane, decane, undecane, dodecane, and an organic residue derived from a branched aliphatic compound such as 2-methylpropane, 2-methylbutane, 2-methylpentane, 3-methylpentane, 3-ethylpentane, 2-methylhexane, 3-methylhexane, 2-ethylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, 2-methylundecane, 2-ethyldecane, 2-methyl-1-butene, 3-methyl-1-butene, 2-methyl-2-butene, 2-methyl-butadiene, 2,3-dimethylbutadiene.

Examples of the organic residue derived from a cyclic aliphatic compound include organic residues derived from cyclopentane, cyclopentene, cyclopentadiene, cyclohexane, 1,2-dimethylcyclohexane, 1,3-dimethylcyclohexane, 1,4-dimethylcyclohexane, 1,2-diethylcyclohexane, 1,3-diethylcyclohexane, 1,4-diethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, and the like.

Examples of the organic residue derived from an aromatic compound include organic residues derived from benzene, toluene, o-xylene, m-xylene, p-xylene, styrene, ethylbenzene, butylbenzene, hexylbenzene, dimethylbenzene, trimethylbenzene, diethylbenzene, and the like.

Among those exemplified above, $R^5$ in the general formula (3) is preferably the organic residue derived from an aliphatic compound and the organic residue derived from a cyclic aliphatic compound. The organic residue derived from an aliphatic compound is more preferred, and the organic residue derived from a saturated aliphatic hydrocarbon compound is even more preferred.

Examples of the phosphoric monoester shown in the present invention include a phosphoric monoester having an aliphatic residue, a monophosphoric ester having a cyclic aliphatic residue, a phosphoric monoester having an aromatic residue, and the like.

Examples of the phosphoric monoester having an aliphatic residue include monomethyl phosphate, monoethyl phosphate, mono-n-propyl phosphate, monoisopropyl phosphate, mono-n-butyl phosphate, mono-n-pentyl phosphate, mono-n-hexyl phosphate, mono-n-heptyl phosphate, mono-n-octyl phosphate, mono-2-ethylhexyl phosphate, mono-n-nonyl phosphate, mono-n-decyl phosphate, mono-n-undecyl phosphate, mono-n-dodecyl phosphate, monoisodecyl phosphate, mono-2-ethyloctyl phosphate, and the like.

Examples of the phosphoric monoester having a cyclic aliphatic residue include monocyclopentyl phosphate, monocyclohexyl phosphate, monodimethylcyclohexyl phosphate, monoethylcyclohexyl phosphate, monodiethylcyclohexyl phosphate, monobutylcyclohexyl phosphate, monotrimethylcyclopentyl phosphate, monoethylmethylcyclopentyl phosphate, monopropylcyclopentyl phosphate, monodiethylcyclobutyl phosphate, monomethyl propylcyclobutyl phosphate, monobutylcyclobutyl phosphate, monodimethylcyclohexenyl phosphate, monoethylcyclohexenyl phosphate, monotrimethylcyclopentenyl phosphate, monoethylmethylcyclopentenyl phosphate, monopropylcyclopentenyl phosphate, monodiethylcyclobutenyl phosphate, monomethylpropylcyclobutenyl phosphate, monobutylcyclobutenyl phosphate, and the like.

Examples of the phosphoric monoester having an aromatic residue include monophenyl phosphate, monomethylphenyl phosphate, monoethylphenyl phosphate, monodimethylphenyl phosphate, monodiethylphenyl phosphate, and the like.

Among these exemplified compounds, monoethyl phosphate, mono-n-propyl phosphate, mono-n-butyl phosphate, mono-n-hexyl phosphate, mono-n-octyl phosphate, mono-n-decyl phosphate, mono-n-dodecyl phosphate, monodimethylhexyl phosphate, monoethylhexyl phosphate, mono-2-ethylcyclohexyl phosphate, and monodiethylcyclohexyl phosphate are preferred from the viewpoint of reduction in the foreign materials or the turbidity in the obtained resin, thereby giving a better appearance. Mono-n-butyl phosphate, mono-2-ethylhexyl phosphate, and mono-n-octyl phosphate are more preferred, and mono-n-butyl phosphate is particularly preferred. These phosphoric monoesters can be each used as single or in a mixture of two or more kinds thereof.

The phosphoric diester in the present invention refers to a compound represented by the general formula (4), wherein $R^6$ and $R^7$ in the formula each represent an aliphatic or aromatic organic residue having 2 to 12 carbon atoms. $R^6$ and $R^7$ may be bonded to each other to form a ring, and may be the same as or different from each other.

$R^6$ and $R^7$ in the general formula (4) are each an aliphatic or aromatic organic residue having 2 to 12 carbon atoms, and preferable examples thereof include an organic residue derived from an aliphatic compound, an organic residue derived from a cyclic aliphatic compound, an organic residue derived from an aromatic compound, and the like.

Examples of the organic residue derived from an aliphatic compound include an organic residue derived from a linear aliphatic compound such as methane, ethane, propane, butane, pentane, hexane, heptane, octane, nonane, decane, undecane, dodecane and an organic residue derived from a branched aliphatic compound such as 2-methylpropane, 2-methylbutane, 2-methylpentane, 3-methylpentane, 3-ethylpentane, 2-methylhexane, 3-methylhexane, 2-ethylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, 2-methylundecane, 2-ethyldecane, 2-methyl-1-butene, 3-methyl-1-butene, 2-methyl-2-butene, 2-methyl-butadiene, 2,3-dimethylbutadiene.

Examples of the organic residue derived from a cyclic aliphatic compound include organic residues derived from cyclopentane, cyclopentene, cyclopentadiene, cyclohexane, 1,2-dimethylcyclohexane, 1,3-dimethylcyclohexane, 1,4-dimethylcyclohexane, 1,2-diethylcyclohexane, 1,3-diethylcyclohexane, 1,4-diethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, and the like.

Examples of the organic residue derived from an aromatic compound include organic residues derived from benzene, toluene, o-xylene, m-xylene, p-xylene, styrene, ethylbenzene, butylbenzene, hexylbenzene, dimethylbenzene, trimethylbenzene, diethylbenzene, and the like.

Among $R^6$ and $R^7$ in the general formula (4) exemplified above, the organic residue derived from an aliphatic compound and the organic residue derived from a cyclic aliphatic compound are more preferred. The organic residue derived from an aliphatic compound is even more preferred.

Examples of the phosphoric diester shown in the present invention include a phosphoric diester having an aliphatic residue, a phosphoric diester having a cyclic aliphatic residue, a phosphoric diester having an aromatic residue, and the like.

Examples of the phosphoric diester having an aliphatic residue include dimethyl phosphate, diethyl phosphate, di-n-propyl phosphate, diisopropyl phosphate, di-n-butyl phosphate, di-n-pentyl phosphate, di-n-hexyl phosphate, di-n-heptyl phosphate, di-n-octyl phosphate, di(2-ethylhexyl) phosphate, di-n-nonyl phosphate, di-n-decyl phosphate, di-n-undecyl phosphate, di-n-dodecyl phosphate, diisodecyl phosphate, di(2-ethyloctyl) phosphate, (ethylhexyl)(n-butyl) phosphate, (ethylhexyl)(n-octyl) phosphate, (ethylhexyl)(propyl pentyl) phosphate, and the like.

Examples of the phosphoric diester having a cyclic aliphatic residue include di(cyclopentyl) phosphate, di(cyclohexyl) phosphate, di(dimethylcyclohexyl) phosphate, di(ethylcyclohexyl) phosphate, di(diethylcyclohexyl) phosphate, di(butylcyclohexyl) phosphate, di(trimethylcyclopentyl) phosphate, di(ethylmethylcyclopentyl) phosphate, di(propylcyclopentyl) phosphate, di(diethylcyclobutyl) phosphate, di(methyl propylcyclobutyl) phosphate, di(butylcyclobutyl)

phosphate, di(dimethylcyclohexenyl) phosphate, di(ethylcyclohexenyl) phosphate, di(trimethylcyclopentenyl) phosphate, di(ethylmethylcyclopentenyl) phosphate, di(propylcyclopentenyl) phosphate, di(diethylcyclobutenyl) phosphate, di(methylpropylcyclobutenyl) phosphate, di(butylcyclobutenyl) phosphate, (dimethylcyclohexyl)(ethylcyclohexyl) phosphate, (dimethylcyclohexyl)(trimethylcyclopentyl) phosphate, (dimethylcyclohexyl)(n-butyl) phosphate, (dimethylcyclohexyl)(dimethylcyclohexenyl) phosphate, and the like.

Examples of the phosphoric diester having an aromatic residue include diphenyl phosphate, di(methylphenyl) phosphate, di(ethylphenyl) phosphate, di(dimethylphenyl) phosphate, di(diethylphenyl) phosphate, (dimethylphenyl)(dimethylhexyl) phosphate, (dimethylphenyl)(cyclohexyl) phosphate, and the like.

Among the compounds exemplified above, diethyl phosphate, di-n-propyl phosphate, diisopropyl phosphate, di-n-butyl phosphate, di-n-hexyl phosphate, di-n-octyl phosphate, di(2-ethylhexyl) phosphate, di-n-decyl phosphate, di-n-dodecyl phosphate, diisodecyl phosphate, di(2-ethyloctyl) phosphate, di(cyclohexyl) phosphate, di(dimethylcyclohexyl) phosphate, di(ethylcyclohexyl) phosphate, di(diethylcyclohexyl) phosphate, di(butylcyclohexyl) phosphate, di(diethylcyclobutyl) phosphate, and di(butylcyclobutyl) phosphate are preferred, from the viewpoint of a reduction in the foreign materials or the turbidity in the obtained resin, thereby giving a better appearance. Di(2-ethylhexyl) phosphate, di-n-octyl phosphate, and di-n-butyl phosphate are more preferred, and di-n-butyl phosphate is particularly preferred. These phosphoric diesters are used as single or in a mixture of two or more kinds thereof.

The amount of the internal mold release agent used is in the range from 0.05 part by weight to 0.4 part by weight, preferably in the range from 0.06 part by weight to 0.3 part by weight, and more preferably in the range from 0.1 part by weight to 0.2 part by weight, based on 100 parts by weight of the total amount of the polyisocyanate compound and the polythiol compound.

From the viewpoint of keeping the releasability of the resin better and providing a desirable appearance of the resin, it is preferable to use the compound represented by the general formula (3) and the compound represented by the general formula (4) in combination. For example, it is preferable to use mono-n-butyl phosphate as the compound represented by the general formula (3) and di-n-butyl phosphate as the compound represented by the general formula (4) in combination. In this case, the mixing ratio of the compound of the general formula (3) to the compound of the general formula (4) is preferably in the range from 5:95 to 50:50, and more preferably from 10:90 to 15:85.

In the case where an injection solution is prepared by adding a reaction catalyst, a release agent or other additives to the isocyanate compounds and the thiols, the addition of the catalyst, the release agent or other additives depends on the solubility in the isocyanate compounds and the thiols. These agents may be preliminarily added to the isocyanate compounds and dissolved therein, or added to the thiols and dissolved therein, or added to a mixture of the isocyanate compounds and the thiols and dissolved therein. Alternatively, these agents may also be dissolved in a part of the isocyanate compounds or thiols used to prepare a master solution, then the master solution may be added in remains of these. The addition order is not limited to the orders in the exemplified methods, and should be appropriately selected on the basis of operability, safety, convenience, and the like.

The mixing is usually carried out at a temperature available for the mixing, and is appropriately determined according to the monomer components added. From the viewpoint of the pot life of the mixture, a low temperature may be preferable in some cases. Further, in the case where additives such as the catalyst, the release agent do not exhibit good solubility in the isocyanate compounds and the thiols, they may be preliminarily warmed, and then dissolved in the isocyanate compounds, the thiols or a mixture thereof in some cases.

Moreover, it may be preferable in many cases to carry out a defoaming treatment under reduced pressure, a filtration treatment under pressurization or reduced pressure, or the like, or other treatments, if necessary, according to the physical properties required for the plastic lens to be obtained.

Subsequently, a lens-casing mold, into which a mixture of the isocyanate compounds and the thiols has been injected, is heated in an apparatus for heating, such as in an oven or in water, at a predetermined temperature program for several hours to several tens of hours to cure and mold the mixture.

The temperature for the polymerization curing is determined by the composition of a mixture, the kind of a catalyst, the shape of a mold, or the like. The polymerization curing is carried out at a temperature of approximately −50 to 200° C. over 1 to 100 hours.

Usually, the polymerization curing is generally initiated at a temperature in the range of 25° C. to 60° C., then slowly elevated to a range of 80° C. to 130° C., and heated at the same temperature for 1 hour to 4 hours.

After completion of the curing molding, by taking it out from the lens-casting mold, a plastic lens can be obtained.

The plastic lens obtained from the optical material of the present invention is intended to improve the strain caused by the polymerization, and it is desirable to carry out an annealing treatment by heating the released lens. The annealing temperature is usually in the range of 80 to 150° C., preferably in the range of 100 to 130° C., and more preferably in the range of 110 to 130° C. The annealing time is usually in the range of 0.5 to 5 hours, and preferably in the range of 1 to 4 hours.

The plastic lens obtained from the optical material of the present invention, is used, if necessary, to form a coating layer on one side or both sides. Examples of the coating layer include a primer layer, a hard coat layer, an anti-reflective layer, an anti-fogging coat layer, an anti-pollution layer, a water-repellent layer, and the like. These coating layers may be used as single, or a multi-layer having a plurality of coating layers may be used. If the coating layer is formed on both sides, the same coating layers or different coating layers may be formed on each side.

In these coating layers, a UV absorber for protecting the lens or the eyes from an ultraviolet ray, an infrared absorber for protecting the eyes from an infrared ray, a light stabilizer or antioxidant for improving the light resistance of the lens, a dye or pigment for enhancing the fashionability of the lens, a photochromic dye or photochromic pigment, an antistatic agent, and in addition, known additives for enhancing the performance of the lens may be used in combination. Various leveling agents for improving the coating properties may be used.

The primer layer is generally formed between the lens substrate (the optical material obtained from the polymerizable composition of the present invention) and the hard coat layer, in order to improve the adhesion to the hard coat layer and the impact resistance of the plastic lenses, and usually has a thickness of about 0.1 to 10 μm.

The primer layer is formed, for example, by an applying method or a dry method. For the applying method, a primer layer is formed by applying the primer composition by a known applying method such as spin coat method, a dip coat method, and then solidifying. For the dry method, a known dry method such as a CVD method, a vacuum deposition method is used to form a layer. When forming the primer layer, a pretreatment such as an alkali treatment, a plasma treatment, a UV treatment may be carried out on the surface of the lens, if necessary, in order to improve the adhesion.

For the primer composition, the solidified primer layer is preferably a material having high adhesion to the lens substrate (the optical material obtained from the polymerizable composition of the invention), and usually a primer composition having a urethane resin, an epoxy resin, a polyester resin, a melanin-based resin, or a polyvinyl acetal as a main component, and the like, is used. The primer composition can be used without a solvent, but a suitable solvent not having an effect on the lens for the purpose of controlling the viscosity of the composition, or other purposes may be used.

The hard coat layer is a coating layer designed so as to provide abrasion resistance, wear resistance, moisture resistance, hot water resistance, heat resistance, weather resistance, or the like for the lens surface, and usually has a thickness of about 0.3 to 30 μm.

The hard coat layer is usually formed by applying the hard coat composition by a known coating method such as spin coat, dip coat, and then curing. Examples of the curing method include curing methods by thermal curing or irradiation of energy rays such as an ultraviolet ray, a visible light. When forming the hard coat layer, a pretreatment such as an alkali treatment, a plasma treatment, a UV treatment may be carried out on the coated surface (the lens substrate or the primer layer), alkali treatment, plasma treatment may be performed, if necessary, in order to improve the adhesion.

For the hard coat composition, generally, a mixture of an organosilicon compound having curability and oxide fine particles (including composite oxide fine particles) of Si, Al, Sn, Sb, Ta, Ce, La, Fe, Zn, W, Zr, In, Ti, and the like is used in many cases. Moreover, in addition to these, amines, amino acids, metal acetylacetonate complexes, metal salts of organic acids, perchloric acids, salts of perchloric acids, acids, metal chlorides, polyfunctional epoxy compounds, or the like may be used. The hard coat composition may be used without a solvent, but a suitable solvent not having an effect on the lens may be used.

The plastic lens of the present invention may be provided with a hard coat layer containing metal oxide fine particles on at least one side. Such a plastic lens is more excellent in light resistance. For this reason, the plastic lens has excellent balance of the high refractive index, light resistance, and further, mechanical strength, which is thus preferable.

Examples of the metal oxide fine particles include one or two or more kinds of the oxide fine particles of metals selected from Si, Al, Sn, Sb, Ta, Ce, La, Fe, Zn, W, Zr, In, and Ti, or composite fine particles thereof. Specifically, they may be those in which inorganic oxide fine particles such as $SiO_2$, $SnO_2$, $Sb_2O_5$, $CeO_2$, $ZrO_2$, $TiO$, $TiO_2$, $Ti_2O_3$, $Ti_2O_5$, and the like are colloidally dispersed in a dispersing solvent, such as water, alcohols, or other organic solvents, or those in which composite fine particles consisting of two or more kinds of inorganic oxides of Si, Al, Sn, Sb, Ta, Ce, La, Fe, Zn, W, Zr, In, or Ti are colloidally dispersed in a dispersing solvent, such as water, alcohols, or other organic solvents. As the metal oxide fine particles, titanium oxide fine particles are preferable, and ones of either anatase type or rutile type can be used. The suitable particle diameter of the metal oxide fine particle is from about 1 to 300 nm.

If the particle diameter of the metal oxide fine particle is in the above-described range, a plastic lens provided with the hard coat layer has a particularly excellent balance of the high refractive index, light resistance, and further, mechanical strength.

Moreover, in order to enhance the dispersion stability in a coating solution, metal oxide fine particles, whose surface had been treated with an organosilicon compound, can also be used.

Examples of the organosilicon compounds as used herein include a monofunctional silane, a bifunctional silane, a trifunctional silane, a tetrafunctional silane, and the like. The treatment may be carried out while the hydrolyzable group is untreated or hydrolyzed. After the treatment, the hydrolyzable group is preferably in the state in which it has undergone a reaction with an OH group of the fine particles, but even when it partially remains, there is no problem with the stability.

The content of the metal oxide particles is appropriately determined depending on the type of the metal oxide particles, the difference between the refractive indices of the plastic lenses and the hard coat layer, the turbidity of the plastic lens after hard coating, and the like. The content of the metal oxide fine particles is preferably from 20 to 80% by mass in the hard coat layer, and more preferably from 30 to 65% by mass. For example, in the case where titanium oxide fine particles are used as the metal oxide fine particles, the content thereof is preferably from 40 to 80% by mass, more preferably from 40 to 70% by mass, and particularly preferably from 40 to 60% by mass. In this range, the plastic lens provided with the hard coat layer containing the metal oxide fine particles has no generation of whiteness, cloudiness, or cracks, turbidity, and is thus preferable.

When the content of the metal oxide fine particles is in this range, the plastic lens provided with the hard coat layer has a particularly excellent balance of high refractive index, light resistance, and further, mechanical strength.

Further, the refractive index (ne) of the hard coat layer is appropriately determined according to the refractive index, and the like, of the plastic lens (plastic lens substrate) obtained by curing the resin composition for the optical material of the present invention. It is preferably from 1.60 to 1.80, and more preferably from 1.68 to 1.75. The refractive index (ne) of the hard coat in the present invention is measured at 20° C. using a Pulfrich refractometer.

In these ranges, a plastic lens provided with a hard coat layer having excellent transparency and light resistance, and less interference pattern can be obtained.

The plastic lens having the hard coat layer in the present invention is one provided with a hard coat layer containing the metal oxide fine particles on at least one side of the plastic lens obtained by curing the polymerizable composition for an optical material as described in the present invention as above. This plastic lens may be used without any treatment, or may be used after an alkaline treatment as a pretreatment. By carrying out an alkali treatment on the surface of substrate, the adhesion to the hard coat layer can be improved.

The hard coat layer containing the metal oxide fine particles in the present invention is obtained from thermosetting silicone-based resins, acryl-based resins, or epoxy-based resins. Among these, silicone-based resins are preferably used. The hard coat layer is generally a cured layer obtained by subjecting to a curing treatment by heating a composition for a hard coat comprised of an organosilicon compound (A) represented by the following formula (X):

$$R_nSi(OR')_{4-n} \tag{X}$$

(wherein R represents an alkyl group, vinyl group, or aryl group having 1 to 6 carbon atoms, or an alkyl group, cycloalkyl group, or aryl group having a vinyl group, a methacryloxy group, an epoxy group, an amino group, a mercapto group, a fluorine atom or a chlorine atom, R' represents a hydrogen atom, or an alkyl group or acyl group having 1 to 3 carbon atoms. n represents an integer of 1 or 2. Further, in the case where n is 2, R may be the same as or different from each other), (B) a colloidally dispersed silica sol, (C) a curing catalyst, (D) at least one organic solvent, and (E) an ultraviolet absorbent, and the layer coated therewith.

The mixing ratio of each of the components of the composition for a hard coat is appropriately determined according to the physical properties, the thickness, and the like of the obtained hard coat layer. The component (A) is usually used at a ratio of 20 to 200 parts by mass, the component (B) is used at a ratio of 40 to 200 parts by mass, the component (C) is used at a ratio of 0.1 to 20 parts by mass, the component (D) is used at a ratio of 1 to 500 parts by mass, and the component (E) is used at a ratio of 0.1 to 5% by mass, based on the coat solution prepared from (A) through (D).

Examples of the organosilicon compound which is the component (A) represented by the general formula (X) include γ-glycidoxypropyltrimethoxysilane, γ-glycidoxypropyltriethoxysilane, γ-methacryloxypropyltrimethoxysilane, γ-methacryloxypropyltriethoxysilane, γ-aminopropyltriethoxysilane, γ-chloropropyltrimethoxysilane, γ-mercaptopropyltrimethoxysilane, γ-mercaptopropyltriethoxysilane, (3,4-epoxycyclohexyl)ethyltriethoxysilane, phenyltrimethoxysilane, phenylmethyldimethoxysilane, vinyltriethoxysilane, trimethylmethoxysilane, dimethyldimethoxysilane, methyltrimethoxysilane, and the like. These can be used as single or in combination of two or more kinds thereof.

The organosilicon compound may be used as it is, and is preferably used as a hydrolysate. The hydrolysate refers to one in which a part or all of the alkoxy groups or acyloxy groups of the silicon compound are substituted with hydroxyl groups, and includes those in which the substituted hydroxyl groups are naturally condensed with each other in part. The hydrolysate can be obtained, for example, by performing hydrolysis in a mixed solvent of water and alcohol, in the presence of an acid.

The colloidally dispersed silica sol which is the component (B), which is also referred to as a colloidal silica, is a sol having silica microfine particles having a particle diameter of 1 to 100 nm dispersed in a dispersing solvent such as water and alcohols, or a dry powder obtained by removing the dispersing solvent from the sol, and commercially available ones can be used for this.

The curing catalyst which is the component (C) is a catalyst required for curing a mixture of the above-described components. In the present invention, from the viewpoints of stability, curability, or the like of the composition for a hard coat, for example, a Lewis acid catalyst, an organoaluminum compound, an organotitanium compound, or the like is used as appropriate. Specifically, aluminum chloride, aluminum perchlorate, aluminum phosphate, aluminum isopropoxide, aluminumacetyl acetonate, tetrabutyl titanate, tetraisopropyl titanate, and the like are exemplified, and aluminumacetyl acetonate is preferred.

Examples of the organic solvent which is the component (D) used in the present invention include alcohols, ketones, esters, ethers, cellosolves, halides, carboxylic acids, aromatic compounds, and these may be used as single or as a mixed solvent of two or more kinds thereof. Particularly, it is preferable to use lower alcohols such as methanol, ethanol, propanol, isopropanol, butanol, cellosolves such as methyl cellosolve, ethyl cellosolve, butyl cellosolve, lower alkyl carboxylic acids such as formic acid, acetic acid, propionic acid, aromatic compounds such as toluene, xylene, and esters such as ethyl acetate, butyl acetate, which are used as single or as a mixed solvent thereof.

Further, a commercially available composition for a hard coat can also be used. Examples thereof include IM9000, IM1186, C410 (manufactured by SDC Technologies, Inc.), and the like.

The hard coat layer in the plastic lens provided with the hard coat layer containing the metal oxide fine particles of the present invention is formed by applying the above-described composition for a hard coat on the surface of the plastic lens substrate by a conventional method such as a dipping method, a spraying method, a roller coating method, a spin coat method, a flow coat method, and then baking and curing at a curing temperature (for example, 130° C.) for 5 minutes to 1 hour, and preferably for 5 minutes to 20 minutes.

The film thickness of the hard coat layer is not particularly limited as long as it is a film thickness not interfering with the original optical characteristics of the plastic lens as described in the present invention. It is preferably from 0.1 to 10 μm, and more preferably from 1 to 3 μm. Further, the hard coat layer is preferably provided on at least one side of the plastic lens substrate as described in the present invention, or preferably formed on both sides. It may be formed on one side according to the use purpose.

In order to improve the adhesion between the plastic lens substrate and the hard coat layer, a primer layer may be provided between the plastic lens substrate and the hard coat layer. The primer layer can improve the adhesion between the plastic lens substrate and the hard coat layer. A silicone-based resin, an acryl-based resin, an epoxy-based resin, or the like may be used for forming the primer layer. Further, a primer layer of an urethane-based resin may be provided in order to improve the impact resistance of the obtained lens.

The anti-reflective layer is usually formed on the hard coat layer, if necessary. Examples of the anti-reflective layer include organic and inorganic ones. In the case of the inorganic ones, they are generally formed in many cases by a dry method such as a vacuum deposition method, a sputtering method, an ion plating method, an ion beam assisting method, a CVD method, using inorganic oxides such as $SiO_2$, $TiO_2$, and the like. In the case of the organic ones, they are generally formed in many cases by a wet method using a composition containing an organosilicon compound and silica-based fine particles having an internal cavity.

The anti-reflective layer may be a monolayer or a multilayer. In the case of a monolayer, it is preferable that its refractive index is lower than the refractive index of the hard coat layer by at least 0.1 or more. In order to effectively exhibit an anti-reflective function, it is preferably a multilayered anti-reflective film, and in this case, a low refractive index film and a high refractive index film are generally alternately laminated. In this case, it is also preferable that the difference between the refractive indices of the low refractive index film and the high refractive index film is 0.1 or more. Examples of the high refractive index film include films of ZnO, $TiO_2$, $CeO_2$, $Sb_2O_5$, $SnO_2$, $ZrO_2$, $Ta_2O_5$, and the like, and examples of the low refractive index film include a $SiO_2$ film, and the like. The film thickness is usually from about 50 to 150 nm.

Moreover, the plastic lens containing the optical material of the present invention may be subjected to backside polishing, antistatic treatment, dyeing treatment, dimming treatment, or the like, if necessary.

This plastic lens can be made to be thinner, and thus, it is useful as a spectacle lens, particularly as a lens for vision correction.

The plastic lens obtained from the polymerizable composition for an optical material of the present invention has excellent strength, in particular excellent tensile strength. Therefore, in the case where the plastic lens of the present invention is used for spectacles with a 2-point frame, even though stress takes place at both ends, the occurrence of cracks, breaks, or the like from there as a starting point is inhibited, thereby improving the durability. In addition, since it is made of a material having a high refractive index, it is possible to make the plastic lens thinner, thereby improving the fashionability. In addition, since the plastic lens has excellent light resistance, the deterioration thereof is suppressed.

As such, the plastic lens of the present invention has a high refractive index, excellent light resistance, and further improved mechanical strength, and is thus excellent in the balance of these physical properties.

EXAMPLES

Hereinbelow, the present invention will be described in more detail with reference to Examples, but the present invention is not limited to these.

(Test Methods)

The resin molded products prepared in Examples and Comparative Examples were evaluated on the optical physical properties (a refractive index and an Abbe number), the heat resistance, the color, and the strength by the following test methods.

Refractive index (ne) and Abbe number (ve): Measured at 20° C. using a Pulfrich refractometer.

Heat resistance: Measured by a TMA penetration method (50 g load, pin tip of 0.5 mmϕ, and temperature elevating rate: 10° C./min). The temperature at an intersection point of the tangent line of the TMA curve upon thermal expansion and the tangent line of the TMA curve upon dropping was taken as a thermal deformation initiating temperature.

Color: The resin color YI value was measured using a colorimeter (CR-200) manufactured by Minolta Co., Ltd. The resin color YI value was measured by making a flat plate having a thickness of 9 mm.

Three Point Bending Test: It was measured by the use of Autograph AGS-J manufactured by Shimadzu Corp. A resin plate of 3 mm in thickness, 25 mm in width and about 70 mm in length was placed on a supporting base in which the distance between both supporting points is 34 mm, and a load was applied from the top at a rate of 1.2 mm/min. When the resin plate was broken, the stress at that point was measured as the maximum point stress ($N/mm^2$).

Tensile strength test: With a 2-point frame process in mind, a resin flat plane, which has a lens diameter of 45 mm and a thickness of 2.5 mm, were drilled holes having a diameter of 1.6 mm at two points on both ends. Further, a 1.6 mm metal-made shaft was penetrated into the holes using AUTOGRAPH AGS-J manufactured by Shimadzu Corporation to fix both ends of the sample at a jig, and then tension was applied at a rate of 5 mm/min, thereby measuring a maximum point test force. A value (kgf/mm) was determined by dividing the obtained maximum point test force with the thickness of the resin flat plane.

Impact resistance: A drop ball test, which a steel ball is dropped from a height of 127 cm of a lens (−2D) having a center thickness of about 1.0 mm to that lens, was carried out in accordance with U.S. FDA regulation, and the broken state of the lens was checked. In the case where there was no breakage, the weight of the steel ball was gradually increased, and the drop ball test was continued until the ball penetrated or there was incorporation of the cracks within the lens. The weight of the steel ball at a time point of the generation of breakage in the lens was taken as a value of the impact resistance. A state in which the steel ball was penetrated or the lens was broken was denoted as "A", and the state in which the star-patterned cracks were generated was denoted as "B". The weight of the steel ball was increased in the order of 8 g, 16 g, 29 g, 33 g, 45 g, 68 g, 95 g, 114 g, 174 g, 229 g, and 542 g.

Light resistance: A quartz lamp (illuminance 41000 lx) was radiated, and the change in the resin colors (YI values) before and after the radiation was observed. A smaller increase in the YI values (ΔYI) indicated a better light resistance. The YI values were measured after 3 days and 9 days, respectively.

Yellowing-resistance against heat: The resin was heated at 150° C. for 1 hour under air conditioning. The change in the color YI values before and after heating was measured.

Evaluation of foreign materials/turbidity in the resin: The resin was covered with a slide projector, and evaluated by the naked eye according to the following criteria.

A: The foreign materials/turbidity in the resin was substantially not found.

B: The foreign materials/turbidity in the resin was slightly found, but it was of a level not providing problems with its use as a specular lens.

SHV: A milli-equivalent (meq/g) of the mercapto groups contained in 1 g of the compound.

Preparative Example 1

In accordance with the method as described in Preparative Example 2 of Japanese Laid-open Patent Publication No. 2004-2820, a polythiol compound A containing 1,1,3,3-tetrakis(mercaptomethylthio)propane as a main component was synthesized.

Into a 2-liter flask with bottom discharge equipped with a stirring blade, a thermometer, a distillation column, and a capillary for introducing nitrogen were added 164.2 g (1 mol) of 1,1,3,3-tetramethoxypropane, 488.8 g (4 mol) of acetylthiomethyl thiol, and 7.6 g (0.04 mol) of paratoluenesulfonic acid, followed by stirring and heating at 40° C. while maintaining the vacuum at 1 kPa or less. Heating was continued for about 18 hours until the distillation of methanol was stopped. After cooling, vacuum was released, and a condenser was equipped instead of a distillation column. Then, 400 ml of methanol, 400 ml of chloroform and 200 ml of 36% hydrochloric acid were added thereto, followed by heating at 60° C. to carry out alcoholysis to synthesize a polythiol compound A containing a target compound, 1,1,3,3-tetrakis(mercaptomethylthio)propane, as a main component.

Suitable amounts of water and chloroform were added thereto for separation, and the chloroform layer was washed several times with water. After chloroform and low-boiling point fractions were isolated by removing the solvent, the residue was filtered through a 3 μm Teflon (registered trademark) filter to obtain 340.0 g of the polythiol compound A. By LC analysis of the polythiol compound A, two components of the polythiol compound component were detected (the area ratios from the chromatogram were 9.8% and 9.8%, respectively). Purification was carried out by subjecting these components to preparative LC, thereby detecting 4,6-bis(mercaptomethylthio)-1,3-dithiane and 2-(2,2-bis(mercaptomethylthio)ethyl)-1,3-dithietane, respectively. The analysis results are shown below.

Further, the SHV of the polythiol compound A (including two components as the side-products as described above) were measured by the following method. To a solution of 95.1 mg of the polythiol compound A in a mixed solvent of 30 ml of chloroform and 30 ml of methanol was slowly added dropwise a 0.05 mol/L of an iodine solution. When 9.7 ml of the solution was added dropwise thereto, the brown color of the dropwise added iodine did not disappear, and taking this point as an equivalent point, the amount of the SH groups contained in the polythiol compound A was determined, and found to be 9.64 meq/g.

i) 1,1,3,3-Tetrakis(mercaptomethylthio)propane
$^1$H-NMR δ (CDCl$_3$): 2.18 (t, 4H), 2.49 (t, 2H), 3.78-3.90 (m, 8H), 4.64 (t, 2H)
$^{13}$C-NMR δ (CDCl$_3$): 26.7, 41.3, 48.7
FT-IR: 538 cm$^{-1}$
MS: m/z=356(M$^+$)

ii) 4,6-Bis(mercaptomethylthio)-1,3-dithiane
$^1$H-NMR δ (CDCl$_3$): 2.02 (t, 2H), 2.56 (t, 2H), 3.77-3.91 (m, 8H), 3.97 (s, 2H), 4.66 (t, 2H)
$^{13}$C-NMR δ (CDCl$_3$): 27.1, 28.8, 38.1, 44.6
FT-IR: 2538 cm$^{-1}$
MS: m/z=276(M$^+$)

iii) 2-(2,2-Bis(mercaptomethylthio)ethyl)-1,3-dithietane
$^1$H-NMR δ (CDCl$_3$): 2.03 (t, 2H), 2.13-2.21 (m, 1H), 2.75-2.80 (m, 1H), 3.79-3.84 (m, 1H), 3.90-3.96 (m, 3H), 4.32-4.35 (m, 2H)
$^{13}$C-NMR δ (CDCl$_3$): 27.2, 32.3, 38.9, 46.2
FT-IR: 2538 cm$^{-1}$
MS: m/z=276(M$^+$)

Example 1

4.35 g of m-phenylene diisocyanate, 5.65 g of the polythiol compound A synthesized by the method described in Preparative Example 1, 2 mg of dibutyltin dichloride as a curing catalyst, 12 mg of an internal mold release agent (product name: Zelec UN manufactured by STEPAN Co., Ltd.), and 5 mg of an ultraviolet absorbent (product name: Viosorb-583 manufactured by Kyodo Yakuhin Co., Ltd.) were mixed and stirred under heating at 60° C. for 10 minutes to make a uniform monomer mixture solution (the molar ratio of the mercapto groups to the isocyanato groups in the monomer mixture, SH/NCO=1.0). This monomer mixture was degassed under reduced pressure for 5 minutes, then filtered through a 3 μm PTFE-made filter, and injected into a mold consisting of a glass mold and a tape, and the temperature was slowly elevated up from 50° C. to 120° C. over 20 hours to perform the polymerization. After completion of the polymerization, the glass mold was released to obtain a resin molded product. The obtained resin molded product was subjected to an annealing treatment at 120° C. for 4 hours. The physical properties of the resin molded product are shown in Table 1.

Examples 2 to 17

In the same manner as the method described in [Example 1], a resin molded product was prepared according to the composition (monomers (the molar ratio of SH groups/NCO groups), the curing catalyst, the internal mold release agent, and the ultraviolet absorber) as described in Tables 1 and 2. The physical properties of the resin molded product are shown in Tables 1 to 3.

Example 18

To a monomer mixture solution as described in Example 7 was added a bluing agent to prepare a resin molded product.

6.36 g of m-phenylene diisocyanate, 1.20 g of m-xylylene diisocyanate, 12.44 g of the polythiol compound A synthesized by the method described in Preparative Example 1, 4 mg of dibutyltin dichloride as a curing catalyst, 6 mg of an internal mold release agent (product name: Zelec UN manufactured by STEPAN Co., Ltd.), 10 mg of an ultraviolet absorbent (product name: Viosorb-583 manufactured by Kyodo Yakuhin Co., Ltd.), and 0.8 ppm of Plast Blue 8514 (manufactured by Arimoto Chemical Co., Ltd.) and 0.4 ppm of Plast Red 8380 (manufactured by Arimoto Chemical Co., Ltd.) as bluing agents were mixed and stirred under heating at 60° C. for 10 minutes to make a uniform monomer mixture solution (the molar ratio of the mercapto groups to the isocyanato groups in the monomer mixture, SH/NCO=1.3). This monomer mixture was degassed under reduced pressure for 5 minutes, then filtered through a 3 μm PTFE-made filter, and injected into a mold consisting of a glass mold and a tape, and the temperature was slowly elevated up from 50° C. to 120° C. over 20 hours to perform the polymerization. After completion of the polymerization, the glass mold was released to obtain a resin molded product. The resin color YI value was improved by 4.7 by the addition of the bluing agents, as compared with the resin color YI value of the molded product obtained in Example 7.

Comparative Example 1

10 mg of dibutyltin dichloride, 60 mg of an internal mold release agent (product name: Zelec UN manufactured by STEPAN Co., Ltd.), and 25 mg of an ultraviolet absorbent (product name: Viosorb-583 manufactured by Kyodo Yakuhin Co., Ltd.) were mixed and dissolved in 23.77 g of m-xylylene diisocyanate at 20° C. to make a uniform solution. To this uniform solution was added 26.23 g of the polythiol compound A synthesized by the method described in Preparative Example 1, followed by mixing and dissolving at 20° C. to make a mixed solution (the molar ratio of the mercapto groups to the isocyanato groups in the monomer mixture, SH/NCO=1.0). This monomer mixture was degassed under reduced pressure for 1 hour, then filtered through a 1 μm PTFE-made filter, and injected into a mold consisting of a glass mold and a tape, and the temperature was slowly elevated up from 40° C. to 100° C. over 21 hours to perform the polymerization. After completion of the polymerization, the glass mold was released to obtain a resin molded product. The obtained resin molded product was subjected to an annealing treatment at 100° C. for 4 hours. The physical properties of the obtained resin molded product are shown in Table 1.

Comparative Example 2

18.23 g of tolylene-2,4-diisocyanate, 21.77 g of the polythiol compound A synthesized by the method described in Preparative Example 1, 8 mg of dibutyltin dichloride as a curing catalyst, 20 mg of an internal mold release agent (product name: Zelec UN manufactured by STEPAN Co., Ltd.), and 20 mg of an ultraviolet absorbent (product name: Viosorb-583 manufactured by Kyodo Yakuhin Co., Ltd.) were mixed and stirred under heating at 60° C. for 10 minutes to make a uniform monomer mixture solution (the molar ratio of the mercapto groups to the isocyanato groups in the monomer mixture, SH/NCO=1.0). This monomer mixture was degassed under reduced pressure for 10 minutes, then filtered through a 3 μm PTFE-made filter, and injected into a mold consisting of a glass mold and a tape, and the temperature was slowly elevated up from 60° C. to 120° C. over 20 hours to perform the polymerization. After completion of the polymerization, the glass mold type was released to obtain a resin molded product. The obtained resin molded product was subjected to an annealing treatment at 120° C. for 2 hours. The physical properties of the resin molded product are shown in Table 1.

Comparative Example 3

In the same manner as the method described in [Comparative Example 1], a resin molded product was prepared according to the monomer composition and the molar ratio of the SH groups/NCO groups as shown in Table 1. The physical properties of the resin molded product are shown in Table 1.

Comparative Example 4

In the same manner as the method described in [Comparative Example 2], a resin molded product was prepared according to the monomer composition and the molar ratio of the SH groups/NCO groups as shown in Table 1. The physical properties of the resin molded product are shown in Table 1.

Comparative Example 5

63.6 g of bis(2,3-epithiopropyl)disulfide and 0.7 g of an ultraviolet absorbent (product name: Tinuvin PS) were mixed and dissolved at 20° C. to make a uniform solution. To this solution was added 6.4 g of 4,8-dimercaptomethyl-1,11-dimercapto-3,6,9-trithiaundecane, followed by mixing and dissolving, and then filtration was carried out through a 3 μm PTFE-made filter. Subsequently, to this solution were added 64 mg of dicyclohexylmethylamine and 13 mg of dimethylcyclohexylamine, followed by mixing and dissolving, and then the mixture was injected into a mold type consisting of a glass mold and a tape, and the temperature was slowly elevated up from 30° C. to 80° C. over 21 hours to perform the polymerization. After completion of the polymerization, the glass mold type was released to obtain a resin molded product. The obtained resin molded product was subjected to an annealing treatment at 120° C. for 3 hours. The physical properties of the obtained resin molded product are shown in Tables 1 to 3.

Comparative Example 6

15 mg of dibutyltin dichloride, 100 mg of an internal mold release agent (Trade name: ZelecUN, manufactured by Stepan Company), and 50 mg of an ultraviolet absorber (Trade name: Viosorb-583, manufactured by Kyodo Chemical Co., Ltd.) were mixed and dissolved in 52.0 g of m-xylylene diisocyanate and 48.0 g of 4-mercapto-1,8-dimercapto-3,6-dithiaoctane at 20° C. to give a homogeneous solution (the molar ratio of the mercapto groups to the isocyanato groups in the monomer mixture: SH/NCO=1.0). This monomer mixture was degassed under reduced pressure for 1 hour, then filtered through a 1 μm PTFE-made filter. Then, it was injected into a mold type consisting of a glass mold and a tape, and the temperature was slowly elevated up from 25° C. to 120° C. over 21 hours to perform the polymerization. After completion of the polymerization, the glass mold was released to obtain a resin molded product. The obtained resin molded product was further subjected to an annealing treatment at 130° C. for 4 hours. The physical properties of the obtained resin molded product are shown in Table 2.

Comparative Example 7

In the same manner as the method described in [Comparative Example 5], the composition (monomers (the molar ratio of SH groups/NCO groups), the curing catalyst, the internal mold release agent, and the ultraviolet absorber) as described in Table 2, were used to prepare a resin molded product. The physical properties of the obtained resin molded product are shown in Table 2.

In Examples 1 to 17, a resin molded product having a high refractive index, and further excellent heat resistance could be obtained. Moreover, in Examples 1, 2, 4, 5, 7 to 9 and 11 to 16, resin molded products having high strength could be obtained, and as such, it could be assumed that in the other Examples, the resin molded products had high strength, from the results of these Examples. In addition, in Examples 1, 2, 4, 7 and 12 to 14 the resin molded products having good light resistance could be obtained, and as such, it could be assumed that in the other Examples, the resin molded products were resins having good light resistance, from the results of these Examples.

The isocyanate compounds in Comparative Examples 1 and 2 are different from that of Example 1. The refractive index was low and the light resistance was deteriorated as compared with Example 1. The isocyanate compounds in Comparative Examples 3 and 4 are different from that of Example 4. The refractive index was low, and the strength and the light resistance were deteriorated as compared with Example 4. As compared with Examples, Comparative Example 5 was equivalent in the refractive indice, but the results that the strength was low and the light resistance was deteriorated were obtained.

Example 17 was compared with Comparative Examples 6 and 7 in the case of using 4-mercapto-1,8-dimercapto-3,6-dithiaoctane as the thiol compound as shown in Table 2. Example 17 in which m-phenylene diisocyanate was used as the isocyanate compound gave excellent balance among the physical properties of high refractive index, heat resistance, mechanical strength, as compared with Comparative Examples 6 and 7 in which other isocyanate compounds were used.

In Table 3, Example 7 was compared with Example 11. By changing from m-xylylene diisocyanate to 1,6-hexamethylene diisocyanate as the monomer, the impact resistance of the resin was improved. Example 11 was compared with Example 12. By additional change of the internal mold release agent, the foreign materials and the turbidity in the resin could be also reduced, and thus, the appearance of the resin could be improved.

Example 12 was compared with Example 15. By additional change of the polymerization catalyst, the impact resistance and the yellowing-resistance against heat were improved. Example 12 was compared with Examples 13 and 14. By additional change of the polymerization catalyst, the light resistance, the impact resistance, the yellowing-resistance against heat and the foreign materials/the turbidity in the resin (the appearance of the resin) were improved.

TABLE 1

| | Composition | | | | | | SH/NCO |
|---|---|---|---|---|---|---|---|
| | Monomers (parts by weight) | | | Polymerization catalyst (ppm) | Internal mold release agent (ppm) | UV absorber (ppm) | molar ratio |
| | Thiol compound | Isocyanate compound | | | | | |
| Example 1 | Compound of Preparative Example 1 (56.5) | m-Phenylene diisocyanate (43.5) | — | DBC (200) | ZelecUN (1200) | Viosorb583 (500) | 1.0 |
| Example 2 | Compound of Preparative Example 1 (57.7) | m-Phenylene diisocyanate (42.3) | — | DBC (200) | ZelecUN (1200) | Viosorb583 (500) | 1.05 |
| Example 3 | Compound of Preparative Example 1 (60.9) | m-Phenylene diisocyanate (39.1) | — | DBC (200) | ZelecUN (1200) | Viosorb583 (500) | 1.2 |
| Example 4 | Compound of Preparative Example 1 (62.8) | m-Phenylene diisocyanate (37.2) | — | DBC (200) | ZelecUN (1200) | Viosorb583 (500) | 1.3 |
| Example 5 | Compound of Preparative Example 1 (64.5) | m-Phenylene diisocyanate (35.5) | — | DBC (200) | ZelecUN (1200) | Viosorb583 (500) | 1.4 |
| Example 6 | Compound of Preparative Example 1 (66.0) | m-Phenylene diisocyanate (34.0) | — | DBC (200) | ZelecUN (1200) | Viosorb583 (500) | 1.5 |
| Example 7 | Compound of Preparative Example 1 (62.2) | m-Phenylene diisocyanate (31.8) | m-Xylylene diisocyanate (6.0) | DBC (200) | ZelecUN (1200) | Viosorb583 (500) | 1.3 |
| Example 8 | Compound of Preparative Example 1 (62.2) | m-Phenylene diisocyanate (26.5) | Tolylene diisocyanate (11.3) | DBC (200) | ZelecUN (1200) | Viosorb583 (500) | 1.3 |
| Example 9 | Compound of Preparative Example 1 (60.0) | m-Phenylene diisocyanate (28.0) | 4,4'-Diphenylmethane diisocyanate (12.0) | DBC (200) | ZelecUN (1200) | Viosorb583 (500) | 1.3 |
| Example 10 | Compound of Preparative Example 1 (62.8) | m-Phenylene diisocyanate (3.4) | p-Phenylene diisocyanate (33.8) | DBC (200) | ZelecUN (1200) | Viosorb583 (500) | 1.3 |
| Example 11 | Compound of Preparative Example 1 (62.7) | m-Phenylene diisocyanate (35.0) | 1,6-Hexamethylene diisocyanate (2.3) | DMC (250) | ZelecUN (600) | Viosorb583 (15000) | 1.3 |
| Example 12 | Compound of Preparative Example 1 (62.7) | m-Phenylene diisocyanate (35.0) | 1,6-Hexamethylene diisocyanate (2.3) | DMC (250) | MBP/DBP = 10/90(1500) | Viosorb583 (15000) | 1.3 |
| Example 13 | Compound of Preparative Example 1 (62.7) | m-Phenylene diisocyanate (35.0) | 1,6-Hexamethylene diisocyanate (2.3) | ZnBTC/TOMAC (75/30) | MBP/DBP = 10/90 (1500) | Viosorb583 (15000) | 1.3 |
| Example 14 | Compound of Preparative Example 1 (62.7) | m-Phenylene diisocyanate (35.0) | 1,6-Hexamethylene diisocyanate (2.3) | ZnBTC (75) | MBP/DBP = 10/90 (1500) | Viosorb583 (15000) | 1.3 |
| Example 15 | Compound of Preparative Example 1 (62.7) | m-Phenylene diisocyanate (35.0) | 1,6-Hexamethylene diisocyanate (2.3) | TOMAC (200) | MBP/DBP = 10/90 (1500) | Viosorb583 (15000) | 1.3 |
| Example 16 | Compound of Preparative Example 1 (62.9) | m-Phenylene diisocyanate (34.7) | 1,5-Pentamethylene diisocyanate (2.4) | ZnBTC/TOMAC (75/30) | MBP/DBP = 10/90 (1500) | Viosorb583 (15000) | 1.3 |
| Comparative Example 1 | Compound of Preparative Example 1 (52.0) | m-Xylylene diisocyanate (47.5) | — | DBC (200) | ZelecUN (1200) | Viosorb583 (500) | 1.0 |
| Comparative Example 2 | Compound of Preparative Example 1 (54.4) | Tolylene diisocyanate (45.6) | — | DBC (200) | ZelecUN (1200) | Viosorb583 (500) | 1.0 |

TABLE 1-continued

| | | | | | | |
|---|---|---|---|---|---|---|
| Comparative Example 3 | Compound of Preparative Example 1 (58.9) | m-Xylylene diisocyanate (41.1) | | DBC (200) V(1200) | ZelecUN (500) | Viosorb583 1.3 |
| Comparative Example 4 | Compound of Preparative Example 1 (60.8) | Tolylene diisocyanate (39.2) | | DBC (200) | ZelecUN (1200) | Viosorb583 (500) 1.3 |
| Comparative Example 5 | Bis(2,3-epithiopropyl)disulfide (90.9) 4,8-dimercaptomethyl-1,11-dimercapto-3,6,9-trithiaundecane (9.1) | | | DCA (180) DCH (910) | — | Tinuvin PS (10000) — |

| | Evaluation items | | | | | |
|---|---|---|---|---|---|---|
| | Optical properties | | Heat resistance Thermal deformation initiating temperature [°C.] | Three point bending test Maximum point stress [N/mm²] | Tensile test using holes Test force/thickness [kgf/mm] | Light resistance (Quartz lamp test) ΔYI (after 3 days) |
| | Refractive index ne | Abbe number ve | | | | |
| Example 1 | 1.739 | 23.0 | 149.5 | 107.2 | 41.8 | 0.4 |
| Example 2 | 1.740 | 23.3 | 145.3 | 161.1 | 43.2 | 1.1 |
| Example 3 | 1.743 | 23.5 | 128.7 | — | — | — |
| Example 4 | 1.743 | 23.7 | 117.5 | 110.2 | 42.5 | 0.6 |
| Example 5 | 1.743 | 23.7 | 106.6 | 137.0 | 41.0 | — |
| Example 6 | 1.744 | 24.5 | 82.6 | — | — | — |
| Example 7 | 1.736 | 24.4 | 116.6 | 147.4 | 42.3 | 1.5 |
| Example 8 | 1.737 | 24.0 | 120.0 | 101.4 | 42.9 | — |
| Example 9 | 1.737 | 23.8 | 120.4 | 115.4 | 39.0 | — |
| Example 10 | 1.742 | 23.5 | 140.3 | — | — | — |
| Example 11 | 1.736 | 23.7 | 114.1 | 223.6 | — | — |
| Example 12 | 1.735 | 23.8 | 113.5 | 225.3 | 44.5 | 0.1 |
| Example 13 | 1.735 | 23.8 | 110.7 | 185.7 | 42.7 | 0.6 |
| Example 14 | 1.735 | 23.8 | 113.8 | 225.9 | 41.1 | 0.3 |
| Example 15 | 1.735 | 23.9 | 113.8 | 214.4 | — | — |
| Example 16 | 1.735 | 23.9 | 109.7 | — | 41.2 | — |
| Comparative Example 1 | 1.693 | 29.8 | 110.4 | 218.1 | 42.3 | 4.2 |
| Comparative Example 2 | 1.716 | 24.4 | 143.2 | 144.1 | 38.0 | 2.2 |
| Comparative Example 3 | 1.699 | 30.1 | 80.5 | 187.0 | 36.1 | 2.8 |
| Comparative Example 4 | 1.722 | 24.5 | 114.9 | 102.4 | 36.3 | 2.3 |
| Comparative Example 5 | 1.737 | 32.1 | 77.6 | 121.0 | 16.6 | 3.0 |

DBC: Dibutyltin dichloride,
DMC: Dimethyltin dichloride,
ZnBTC: Zinc dibutyl dithiocarbamate,
TOMAC: tri-n-Octylmethylammonium chloride,
DCA: Dimethylcyclohexylamine,
DCH: Dicyclohexylmethylamine,
ZelecUN: manufactured by Stepan Company,
MBP/DBP = 10/90: Mixture of monobutylphosphoric acid (MBP) and dibutylphosphoric acid (DBP) at 10:90 (ratio by weight),
Viosorb583: manufactured by Kyodo Chemical Co., Ltd.,
Tinuvin PS: manufactured by Ciba Specialty Chemicals.

TABLE 2

| | Composition | | | | | | Evaluation items | | | | | |
|---|---|---|---|---|---|---|---|---|---|---|---|---|
| | Monomers (parts by weight) | | Polymerization catalyst (ppm) | Internal release agent (ppm) | UV absorber (ppm) | SH/NCO molar ratio | Optical properties | | Heat resistance Thermal deformation initiating temperature [°C.] | Three point bending test Maximum point stress [N/mm²] | Tensile test using holes Test force/thickness [kgf/mm] | light resistance (Quartz lamp test) ΔYI (after 3 days) |
| | Thiol compound | Isocyanate compound | | | | | Refractive index ne | Abbe number ve | | | | |
| Example 17 | 4-Mercapto-1,8-dimercapto-3,6-dithiaoctane (52.0) | m-Phenylene diisocyanate (48.0) | DBC (100) | ZelecUN (1000) | Viosorb583 (500) | 1.0 | 1.711 | 23.6 | 130.8 | 191.2 | 37.8 | — |

TABLE 2-continued

| | Composition | | | | | Evaluation items | | | | | |
|---|---|---|---|---|---|---|---|---|---|---|---|
| | | | | | | Optical properties | | Heat resistance | Three point bending test | Tensile test using holes | light resistance |
| | Monomers (parts by weight) | | Polymerization catalyst (ppm) | Internal release agent (ppm) | UV absorber (ppm) | SH/NCO molar ratio | Refractive index ne | Abbe number ve | Thermal deformation initiating temperature [°C.] | Maximum point stress [N/mm²] | Test force/thickness [kgf/mm] | (Quartz lamp test) ΔYI (after 3 days) |
| | Thiol compound | Isocyanate compound | | | | | | | | | | |
| Comparative Example 6 | 4-Mercapto-1,8-dimercapto-3,6-dithiaoctane (48.0) | m-Xylylene diisocyanate (52.0) | DBC (150) | ZelecUN (1000) | Viosorb583 (500) | 1.0 | 1.665 | 31.5 | 89.9 | 177.0 | 40.6 | 1.4 |
| Comparative Example 7 | Bis(2,3-epithiopropyl)disulfide (95.0) 4-mercapto-1,8-dimercapto-3,6-dithiaoctane (5.0) | | DCA (1000) | — | — | — | 1.735 | 33.7 | 72.0 | — | — | — |

DBC: Dibutyltin dichloride,
DCA: Dimethylcyclohexylamine,
ZelecUN: manufactured by Stepan Company,
Viosorb583: manufactured by Kyodo Chemical Co., Ltd.

TABLE 3

| | Composition | | | | | | |
|---|---|---|---|---|---|---|---|
| | Monomers (parts by weight) | | Polymerization catalyst (ppm) | Internal release agent (ppm) | UV absorber (ppm) | SH/NCO molar ratio | |
| | Thiol compound | Isocyanate compound | | | | | |
| Example 7 | Compound of Preparative Example 1 (62.2) | m-Phenylene diisocyanate (31.8) m-Xylylene diisocyanate (6.0) | DBC (200) | ZelecUN (1200) | Viosorb583 (500) | 1.3 | |
| Example 11 | Compound of Preparative Example 1 (62.7) | m-Phenylene diisocyanate (35.0) 1,6-Hexamethylene diisocyanate (2.3) | DMC (250) | ZelecUN (600) | Viosorb583 (15000) | 1.3 | |
| Example 12 | Compound of Preparative Example 1 (62.7) | m-Phenylene diisocyanate (35.0) 1,6-Hexamethylene diisocyanate (2.3) | DMC (250) | MBP/DBP = 10/90 (1500) | Viosorb583 (15000) | 1.3 | |
| Example 13 | Compound of Preparative Example 1 (62.7) | m-Phenylene diisocyanate (35.0) 1,6-Hexamethylene diisocyanate (2.3) | ZnBTC/TOMAC (75/30) | MBP/DBP = 10/90 (1500) | Viosorb583 (15000) | 1.3 | |
| Example 14 | Compound of Preparative Example 1 (62.7) | m-Phenylene diisocyanate (35.0) 1,6-Hexamethylene diisocyanate (2.3) | ZnBTC (75) | MBP/DBP = 10/90 (1500) | Viosorb583 (15000) | 1.3 | |
| Example 15 | Compound of Preparative Example 1 (62.7) | m-Phenylene diisocyanate (35.0) 1,6-Hexamethylene diisocyanate (2.3) | TOMAC (200) | MBP/DBP = 10/90 (1500) | Viosorb583 (15000) | 1.3 | |
| Comparative Example 5 | Bis(2,3-epithiopropyl)disulfide (90.9) 4,8-dimercaptomethyl-1,11-dimercapto-3,6,9-trithiaundecane (9.1) | | DCA (180) DCH (910) | — | Tinuvin PS (10000) | — | |

TABLE 3-continued

| | light resistance | | | Yellowing-resistance against heat ΔYI at 150° C., 1 hr | Foreign materials/turbidity in resin Assessment by the naked eye |
|---|---|---|---|---|---|
| | (Quartz lamp Test) ΔYI (after 3 days) | (Quartz lamp Test) ΔYI (after 9 days) | Impact resistance Drop ball weight | | |
| Example 7 | 1.5 | 14.6 | 8.54 g B | 12.4 | B |
| Example 11 | — | — | 67.82 g A | 10.3 | B |
| Example 12 | 0.1 | 8.5 | 33.15 g B | 10.5 | A |
| Example 13 | 0.6 | 5.2 | 229.43 g A | 3.2 | A |
| Example 14 | 0.3 | 9.4 | 542.26 g A | 3.3 | A |
| Example 15 | — | — | 95.10 g A | 2.7 | A-B |
| Comparative Example 5 | 3.0 | 5.2 | 28.70 g B | 2.3 | A |

DBC: Dibutyltin dichloride,
DMC: Dimethyltin dichloride,
ZnBTC: Zinc dibutyl dithiocarbamate,
TOMAC: tri-n-Octylmethylammonium chloride,
DCA: Dimethylcyclohexylamine,
DCH: Dicyclohexylmethylamine,
ZelecUN: manufactured by Stepan Company,
MBP/DBP = 10/90: Mixture of monobutylphosphoric acid (MBP) and dibutylphosphoric acid (DBP) at 10:90 (ratio by weight),
Viosorb583: manufactured by Kyodo Chemical Co., Ltd.,
Tinuvin PS: manufactured by Ciba Specialty Chemicals.

Example 19

Titanium oxide fine particles were added to a hard coating agent IM9000 (manufactured by SDC Technologies, Inc.) such that the content of the titanium oxide fine particles was 55% by mass when forming into a hard coat layer, thereby preparing a hard coat composition for hard coating.

The resin molded product after annealing, obtained in Example 7 was pretreated according to a known method, and the hard coat composition for hard coating was coated by a dip coat method, air-dried at 25° C. for 10 minutes, and then calcined at 105° C. for 4 hours.

For the hard coat layer, the film after curing was smooth, and the generation of craters, breaks, or rough surfaces, or others could not be found.

For the plastic lens provided with the hard coat layer obtained in Example 19, an adhesion test for the hard coat layer was carried out with reference to a JIS-K5600 adhesion test (cross-cut method). First, a cutter knife was used with the spacers at regular intervals so as to put a 1-mm cut in the sample, thereby forming 25 pieces of 1-mm² grids. A transparent pressure sensitive adhesive tape was adhered thereon, and then peeled off at 60°, and the remaining grids having the coated film remaining thereon were counted. As a result, the edge of the cut was completely smooth, and thus, no peeling was found in any of the grids.

For the plastic lens provided with a hard coat layer on the resin molded product after annealing, obtained in Example 19, and the plastic lens not provided with a hard coat layer (Example 7), a quartz lamp (illuminance 410001 x) was radiated for 3 days to carry out the light resistance test. The resin colors (YI values) were measured for the plastic lens provided with a hard coat layer and the plastic lens not provided with a hard coat layer, after radiation, respectively. The difference in the resin colors was 1.4, and it could be confirmed that the plastic lens provided with a hard coat had much better light resistance, as compared with the plastic lens having no hard coat.

Example 20

Titanium oxide fine particles were added to a hard coating agent C410 (manufactured by SDC Technologies, Inc.) such that the content of the titanium oxide fine particles was 60% by mass when forming into a hard coat layer, thereby preparing a hard coat composition for hard coating.

The resin molded product after annealing, obtained in Example 7 was pretreated according to a known method, and the hard coat composition for hard coating was coated by a dip coat method, air-dried at 25° C. for 10 minutes, and then calcined at 105° C. for 4 hours.

For the hard coat layer, the film after curing was smooth, and the generation of craters, breaks, or rough surfaces, or others could not be found.

For the plastic lens provided with the hard coat layer obtained in Example 20, an adhesion test for the hard coat layer was carried out with reference to a JIS-K5600 adhesion test (cross-cut method). First, a cutter knife was used with the spacers at regular intervals so as to put a 1-mm cut in the sample, thereby forming 25 pieces of 1-mm² grids. A transparent pressure sensitive adhesive tape was adhered thereon, and then peeled off at 60°, and the remaining grids having the coated film remaining thereon were counted. As a result, the edge of the cut was completely smooth, and thus, no peeling was found in any of the grids.

For the plastic lens provided with a hard coat layer on the resin molded product after annealing, obtained in Example 20, and the plastic lens not provided with a hard coat layer (Example 7), a quartz lamp (illuminance 410001 x) was radiated for 3 days to carry out the light resistance test. The resin colors (YI values) were measured for the plastic lens provided with a hard coat layer and the plastic lens not provided with a hard coat layer, after radiation, respectively. The difference in the resin colors was 1.4, and it could be confirmed that the plastic lens provided with a hard coat had much better light resistance, as compared with the plastic lens having no hard coat.

What is claimed is:

1. A polymerizable composition for an optical material, comprising:
   m-phenylene diisocyanate, and
   at least one polythiol compound selected from the group consisting of 4-mercaptomethyl-1,8-dimercapto-3,6-dithiaoctane, 4,8-, 4,7- or 5,7-dimercaptomethyl-1,11-dimercapto-3,6,9-trithiaundecane, 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane and tris(mercaptomethylthio)methane.

2. The polymerizable composition for an optical material as described in claim 1, wherein the molar ratio represented by SH groups/NCO groups is 1.0 to 2.0.

3. The polymerizable composition for an optical material as described in claim 1, further comprising an aliphatic polyisocyanate compound having 4 to 8 carbon atoms.

4. The polymerizable composition for an optical material as described in claim 3, wherein the aliphatic polyisocyanate compound having 4 to 8 carbon atoms is at least one selected from the group consisting of hexamethylene diisocyanate and pentamethylene diisocyanate.

5. The polymerizable composition for an optical material as described in claim 1, further comprising a compound represented by the general formula (1) and/or a compound represented by the general formula (2):

wherein M represents Al, Fe, Cu, Zn, Zr or Bi, L represents a dithiocarbamic acid group, a sulfonic acid group, a mono- or dialkylphosphoric ester group, a substituted acetylacetonato group or halogen, and n represents an integer of 1 to 5,

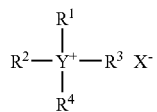

wherein R1, R2, R3 and R4 each independently represent hydrogen, a monovalent or greater linear aliphatic, cyclic aliphatic or aromatic organic residue, R1, R2, R3 and R4 may be bonded to each other to form a ring, X represents an organic acid group or an inorganic acid group and Y represents a nitrogen or phosphorus atom.

6. The polymerizable composition for an optical material as described in claim 1, further comprising a phosphoric monoester represented by the general formula (3) and/or a phosphoric diester represented by the general formula (4):

wherein R5 represents an aliphatic or aromatic organic residue having 2 to 12 carbon atoms,

wherein $R^6$ and $R^7$ each represent an aliphatic or aromatic organic residue having 2 to 12 carbon atoms, $R^6$ and $R^7$ may be bonded to each other to form a ring, and may be the same as or different from each other.

7. An optical material obtained by curing the polymerizable composition for an optical material as described in claim 1.

8. A plastic lens obtained by curing the polymerizable composition for an optical material as described in claim 1.

9. A method for preparing an optical material, comprising curing the polymerizable composition for an optical material as described in claim 1.

10. The method for preparing an optical material as described in claim 9, which comprises molding the polymerizable composition for an optical material by cast polymerization.

11. The plastic lens as described in claim 8, which has a hard coat layer containing metal oxide fine particles on at least one side.

12. The plastic lens as described in claim 11, wherein the hard coat layer contains 20 to 80% by mass of metal oxide fine particles.

13. The plastic lens as described in claim 12, wherein the metal oxide fine particles are titanium oxide fine particles.

* * * * *